(12) United States Patent
Nakashima et al.

(10) Patent No.: US 6,721,465 B1
(45) Date of Patent: Apr. 13, 2004

(54) NON-CONTACT IMAGE READER AND SYSTEM USING THE SAME

(75) Inventors: Keisuke Nakashima, Hitachi (JP); Toshiaki Nakamura, Hitachinaka (JP); Shinichi Shinoda, Hitachi (JP); Yoshiharu Konishi, Owariasahi (JP); Mitsunari Kanou, Seto (JP); Akihiro Kawaoka, Nagoya (JP); Shunichi Enomoto, Toyota (JP); Hisao Ogata, Kokubunji (JP); Takanari Tanabata, Ishioka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/409,223

(22) Filed: Sep. 30, 1999

(30) Foreign Application Priority Data

Sep. 30, 1998 (JP) .......................................... 10-276953
Jul. 21, 1999 (JP) .......................................... 11-205750
Sep. 1, 1999 (JP) .......................................... 11-247147

(51) Int. Cl.$^7$ ................................................. G06K 9/00
(52) U.S. Cl. .................. 382/318; 382/255; 358/474
(58) Field of Search ................................. 382/255, 284, 382/312, 318, 319; 358/505, 523, 524, 474; 355/18; 348/207.99; 396/65, 52; 359/446, 448, 472

(56) References Cited

U.S. PATENT DOCUMENTS

| | | | | |
|---|---|---|---|---|
| 5,362,958 A | * | 11/1994 | Ando | 250/208.1 |
| 5,585,926 A | * | 12/1996 | Fujii et al. | 358/471 |
| 5,847,884 A | * | 12/1998 | Kamon et al. | 359/806 |
| 6,177,979 B1 | * | 1/2001 | Oliva | 355/53 |
| 6,522,412 B2 | * | 2/2003 | Norita et al. | 356/601 |
| 6,560,374 B1 | * | 5/2003 | Enomoto | 382/284 |

* cited by examiner

*Primary Examiner*—Yon J. Couso
(74) *Attorney, Agent, or Firm*—Antonelli, Terry, Stout & Kraus, LLP

(57) ABSTRACT

A simple non-contact image reader of high degree of freedom comprising a reading unit for reading images, a reading condition changing unit for changing the reading conditions of the reading unit, a storage unit for storing two read images which are read under two different reading conditions changed, and an image correction unit for composing two read images stored and developing them on a plane, wherein characters written on the surface of a folded form or a thick book can be read in a good operability state and on a high image quality basis by reading images in non-contact.

10 Claims, 39 Drawing Sheets

(a)

(b)

(c)

Mr. Taro Hitachi

Omika-cho, Hitachi-shi

Ibaraki    319-1221
319122115689

(d)

(a)

(b)

(c)

(d)

NON-CONTACT IMAGE READER AND SYSTEM USING THE SAME

BACKGROUND OF THE INVENTION

The present invention relates to a non-contact image reader for reading, recognizing, and checking information, such as document information written on a medium, such as paper, containing printed characters and figures, images, or stamped prints, and inputting the information as image data. The present invention also relates to a document information correction device using the non-contact reader, a control system suited to the device, and a system using the device.

Image input devices, which are commercially available at present, include a flat bed scanner, a sheet scanner, a digital camera, and a camera for paintings and calligraphic works. However, with respect to the currently available flat bed scanner, although the resolution of this device is high, the required installation area is large and the reading speed is low; and, with respect to the currently available sheet scanner, although the required installation area is small, it can read only data on documents in sheet form. With respect to the camera for paintings and calligraphic works, although the resolution thereof is high and some cameras for paintings and calligraphic works can read solids, the device typically is large in scale and the cost thereof is high. As mentioned above, these devices have merits and demerits, and, therefore, they do not completely satisfy the needs of all users.

For purposes of reading documents in a non-contact manner, there are methods, for example, as described in Japanese Patent Application Laid-open 8-9102 (Document 1); Japanese Patent Application Laid-Open 8-274955 (Document 2); Japanese Patent Application Laid-Open 8-154153 (Document 3, Mirror); Japanese Patent Application Laid-Open 8-97975 (Document 4, Book copy); Japanese Patent Application Laid-open 10-13622 (Document 5, White board); and Japanese Patent Application Laid Open 9-275472 (Document 6, Active illumination).

As related references, there are Matsuyama et al., "Edge detection using multifocus images and distance measurement", Electronic Information Communication Society Journal, Vol. J77-D-II, pp. 1048–1058, 1994, (Reference 1); Kodama et al., "Emphatic acquisition of total focus images using generation of optional focus image generation off-focus images including the parallax from a plurality of images different in focus", Electronic Information Communication Society Journal, Vol. J79-D-II, No. 6, pp. 1046–1053, 1996/6, (Reference 2); and Seong Ik CHO, et al, "Shape Recovery of Book Surface Using Two Shade Images Under Perspective Condition", T. IEE JAPAN, Vol. 117-C, No. 10, pp. 1384–1390, 1997 (Reference 3).

The digital camera is superior from the aspect of easily inputting images. However, when the digital camera is used as an image input device for a document, because all information, such as characters, figures, and images, printed on the image plane, such as the surface of a paper, is important, in order to read the information precisely, it is necessary to place the object to be read in an ideal plane state as much as possible and to image the object with the camera precisely positioned opposite the face of the object.

Various proposals for correcting an image which is being read with a camera and which is not positioned precisely opposite to the face of an object being viewed from the front have been made. For example, in Japanese Patent Application Laid-Open 9-289611, there is disclosed a digital camera which is capable of correcting a slant image of an object to produce a pseudo-front image.

However, it is difficult to always keep a medium, such as paper in a flat state, and, actually, the paper is often uneven. When imaging such a paper surface, the conventional flat bed scanner prevents deformation of the image by pressing the paper surface onto a reading surface, such as glass, in order to input the image in a state free of irregularities.

Furthermore, an information correction process for reading a document, referring to a data base for other information, which is not included in the document, and adding the other information to the document, as described in, for example, Japanese Patent Application Laid-open 10-99791, "Method for processing change of address of distribution article". In this information correction process, the destination information described on a distribution article is read, the distribution original data base is referred to, and when address change information is registered, the old address is converted to the changed address, and the changed address and name are output to a transfer label. It is described in the patent application that by doing this, the hand work of an operator can be reduced.

SUMMARY OF THE INVENTION

However, in the aforementioned conventional examples, it is a premise that a document on an image plane is read almost from above (Documents 1 to 3) and cannot be read from a free position.

A proposal to correct the measuring position by reading a calibration marker (Document 5: white board) has been made. However, a problem arises in that the operation is complicated.

Also, with respect to measurement of the distance to the reading surface from a sensor, the viewing of an observation article sideways (Document 4: book copy), the use of active illumination Document 6: active illumination), and the use of a stereo-camera have been proposed. However, a problem arises in each of these techniques in that the accuracy is bad and the cost is high.

A proposal (References 1 to 3) that the front image is restructured from the obtained distance data has also been made. The simulation by a computer shows that it is necessary to improve the processing speed to make this proposal practicable as an actual product.

When a conventional flat bed scanner is used, the scanning of the reading head takes a lot of time, and when there are many objects to be read, reading requires a lot of time. There is a limit to the reading environment, and the reading position and size are limited. Furthermore, a flat bed scanner is typically large in cross direction, so that installation of the equipment requires a large area.

According to Japanese Patent Application Laid-open 10-99791, the correspondence of postal articles with changed address labels is realized only in a particular sequence, and so a problem arises that, if the sequence of distribution of the articles is broken for any reason, the required correspondence between the articles and the labels cannot be obtained.

An object of the present invention is to provide a non-contact image reader for reading characters written on the surface of a folded form or a thick book in a good operability state and on a high image quality basis.

An another object of the present invention is to provide a non-contact image reader which is simple and has a high degree of freedom.

Still another object of the present invention is to provide a digital camera for use instead of a flat bed scanner and for reading, in this case, even a document or an image which is easily folded, as plane image data.

A further object of the present invention is to provide a document correction device for preventing a mistake in a corresponding relationship when additionally recording a change of address and for returning information on the distribution of an article and performing an effective operation.

To solve the aforementioned problems, the present invention comprises a reading unit for reading images, a reading condition changing unit for changing the reading conditions of the reading unit, a storage unit for storing at least two read images which are read under at least two different reading conditions, and an image correction unit for composing at least two read images and for developing them on a plane.

By reading an image while changing the reading conditions like this, it is possible to analyze the displacement of the image and measure the distance. The image can be developed on a plane from the distance. It is also possible to read not only the upper part of a document, but also to read the other portions at various angles. Therefore, it is possible to read an image on a high image quality basis without pressing a folded form or a thick book. Thus, non-contact image reader having a simple constitution which has a high degree of freedom and is in a good operability state can be provided.

Furthermore, the present invention provides a system comprising a scanner unit including a reading unit for reading images, a reading condition changing unit for changing the reading conditions of the reading unit, a storage unit for storing at least two read images which are read under at least two different reading conditions, and an image correction unit for composing at least two read images and for developing them on a plane; an image processing unit for recognizing an image correction signal output from the scanner unit and for performing image processing; an image display unit for displaying the image-processed data; and an image storage unit for outputting the image-processed data.

By use of such a system, a simple non-contact image reading system requiring a small area on a desk can be provided because not only can an image of high image quality be read in a good operability state, but also the image processing unit, such as a personal computer, and the scanner unit can be connected directly.

Furthermore, to accomplish the above objects, the present invention employs a digital camera including a reading means for digitizing and reading images and a storage means for storing the images read by the reading means, which is characterized in that the digital camera has an image correction means for correcting read images as plane image data when a document is read by the reading means and for outputting the corrected image data. In this case, the digital camera may be structured so that the corrected image data is output to the storage means.

By use of such a device, the reading unit can read images by changing the reading conditions, for example, such as the focus position and swing angle. The image correction means detects characteristic points between images from a plurality of images read under a plurality of different conditions, and, from the diffusion amount of images at that time, the distance between each point of the document and the reading means can be measured. By use of the measured distance, an uneven image can be developed to a plane image. By performing texture mapping necessary to development of an uneven image into a plane image by hardware, a speeding up of the processing can be possible. By integrating and processing distorted images by slant reading in the aforementioned texture mapping process, the conversion count can be reduced, and it can be possible to improve the image quality and increase the processing speed. Furthermore, by changing the filter factor according to the distance and adding and composing images whose diffusion is corrected according to the distance, the white noise caused by photoelectric conversion can be reduced.

The present invention utilizes a digital camera including a reading means for digitizing and reading images and a storage means for storing the images read by the reading means, which is characterized in that the digital camera has an image correction means for correcting read images as plane image data when a document is divided and read by the reading means, a temporary storage means for temporarily storing the corrected image data, and an image combination means for combining a plurality of image data stored in the temporary storage means and outputting them to the storage means.

In such a system, by correcting the images divided and read by the reading unit using the image correction means as plane image data and then combining them using the image combination means, a huge plane image which cannot be fetched by one imaging can be obtained.

When constituting the aforementioned digital camera, the following elements can be added.

(1) The image correction means can be structured so that it detects the distance between each point of the aforementioned document and the reading means from the read results when the reading means changes the focus distance and reads the document several times, and it also divides the read images into polygons and develops the read images in a three-dimensional shape on a plane for each polygon according to the detected distance.

(2) The image correction means can be structured so that when the reading means reads a fixed form of document, it extracts characteristic points of the object from the read image and corrects the distortion generated in the image.

(3) The image correction means can be structured so that it includes a mode for inputting the read image read by the reading means to the storage means as it is and a mode for correcting the read image using the image correction means and inputting it to the storage means, and the two modes can be freely selected.

(4) A characteristic point extraction unit for extracting characteristic points of an object from a read image and a reading range extraction unit for extracting the reading range in the image from the information of extracted characteristic points are provided.

(5) A radio data communication means for performing image data transfer with the outside is provided.

Furthermore, to solve the aforementioned problems, a system for reading the image of a distribution article using a non-contact scanner of a phase-up type and additionally recording information on the distribution article in units of one communication is used. Furthermore, with respect to the additional recording method, not only a method for attaching a label, but also a function is provided wherein, when there is a space for additional recording provided on the surface of a distribution article, information can be directly printed additionally. This additional recording function is selective and a candidate for which method is desirable for the equipment is output according to the read image and an operator can select it.

The starting process for the non-contact scanner is structured so that an operator can simply start the machine operation using a machine switch which is mounted in the same pointer frame as that of the additional recording area change switch and additional recording system selection switch. As a result, misattaching of a label can be prevented and when direct printing is available, the man-hours required for attaching a label can be reduced, so that the operator can perform the operation effectively. Furthermore, label papers can be saved by use of direct printing, the working time can be reduced by the highly efficient operation, and the electricity consumption can be reduced, so that the system can contribute to protection of the earth's resources.

BRIEF DESCRIPTION OF THE DRAWINGS

FIGS. 36(a) to 36(d) are conceptual diagrams of image analysis.

FIGS. 39(a) to 39(d) are conceptual diagrams used to explain information correction.

DESCRIPTION OF THE PREFERRED EMBODIMENTS

Various embodiments of the present invention will be explained with reference to the accompanying drawings.

Figure 1:
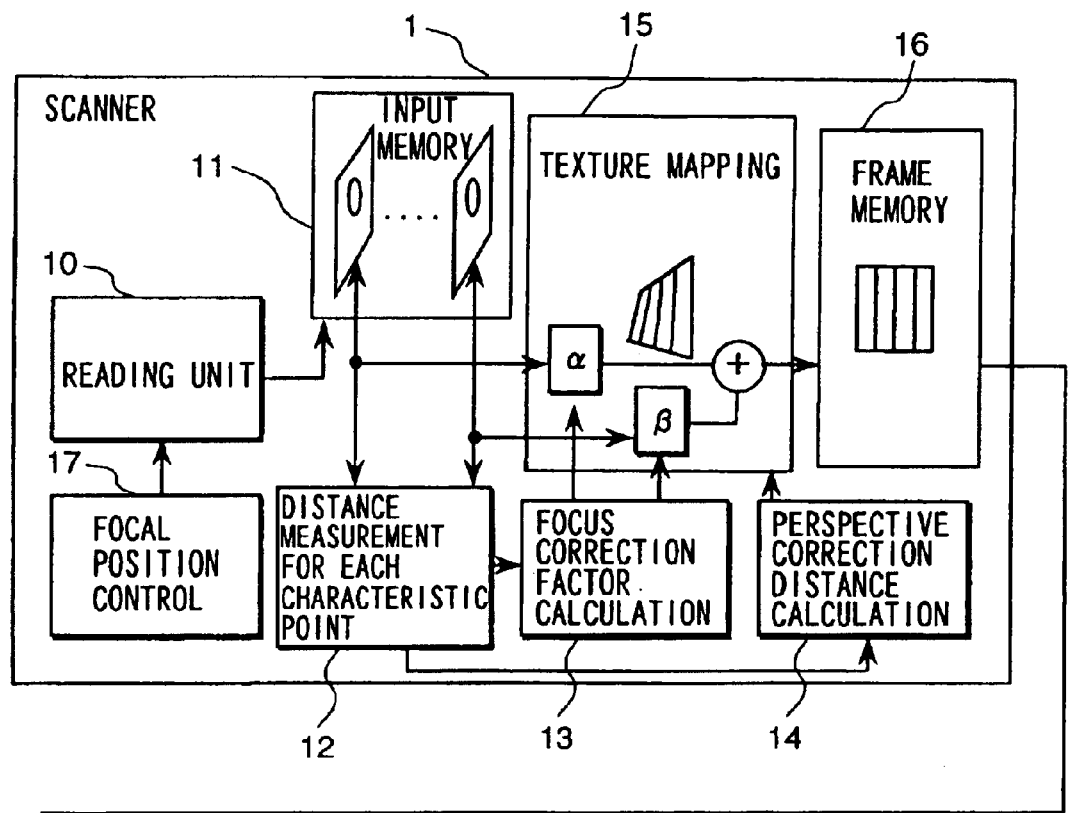
FIG. 1 is a block diagram showing an embodiment of a non-contact image reader in accordance with the present invention.
Figure 1:
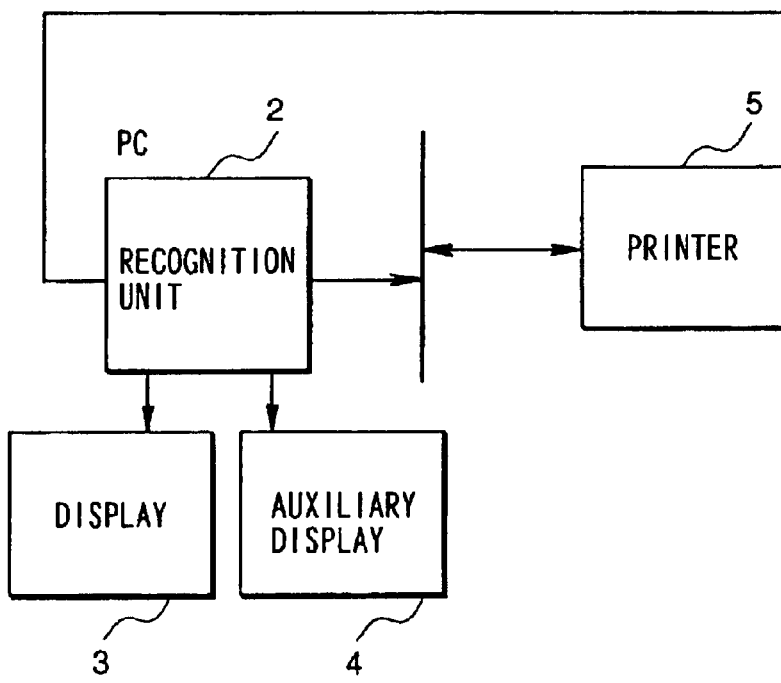

FIG. 1 is a block diagram of a non-contact image reader which represents an embodiment of the present invention. The equipment of the present invention reads a document on a desk using a scanner 1, corrects the image, transfers data to a personal computer 2, executes recognition of characters and figures and processing of the image, displays the recognition result and target image on a display 3 or an auxiliary display 4, and outputs the data to a printer 5, if necessary.

The scanner 1 of the present invention reads images using a reading unit 10, digitizes them, and stores them in an input memory 11. In the reading operation, the reading unit 10 changes the reading conditions, such as the focus, on the basis of a signal received from a focal position control unit 17, changes the reading swing angle, executes the reading process several times, and stores a plurality of images in the input memory 11. In this case, the focal position control unit 17 sets a plurality of proper focal positions which can be obtained from the location relationship of the optical system and a document and the swing angles beforehand, sequentially combines the parameters, and scans them using a pulse motor on the basis of a reading instruction received from a user. By doing this, for example, when the user requests the reading of a document, a forward scan operation is executed in a state in which the focus is on the document stand, and then a back scan operation is executed in a state in which the focus is on a position 3 centimeters above the document stand. In this way, the reading process can be performed on the basis of successive back and forward scans.

Using the plurality of images obtained in this way, a distance measuring unit 12 for each characteristic point calculates the deviation between images and extracts characteristic points. In this case, by correcting a change in image due to the reading condition, a part whose image differs depending on the reading condition is read as a characteristic point. The distance is measured from the difference of the image at this characteristic point.

Next, using the aforementioned distance, a focus correction factor calculation unit 13 corrects the diffusion due to the focal position, and a texture mapping unit 15 increases the ratio of an image whose focal position is close, so that an image is formed.

Next, a perspective correction distance calculation unit 14 calculates the geometrical correction amount at the time of reading, the tilt correction amount, and the correction amount of an image distortion caused when a document has a thickness or is folded, and the texture mapping unit 15 corrects the deformation of the image and stores the corrected image in a frame memory 16. Thereafter, the data is transferred to the personal computer 2.

By use of such a scanner, a special distance measuring sensor is not required, so that an imager which is low in cost can be provided. Since the distance can be measured for each characteristic point, an effect is produced wherein, for example, not only a body distorted in the sub-scan reading direction, but also a form complicatedly folded, or the surface of a three-dimensional body, can be read. Since images are composed using images read at a plurality of focuses, an effect is obtained in that images with little noise and diffusion can be obtained. Since the geometrical correction and distance correction are executed at the same time, an effect is obtained in that images with little deterioration of the image quality can be provided. Since the personal computer and scanner can be directly connected to each other, an effect is obtained in that the required installation space on the desk is small. Each function will be explained hereunder in more detail.

Figure 2:
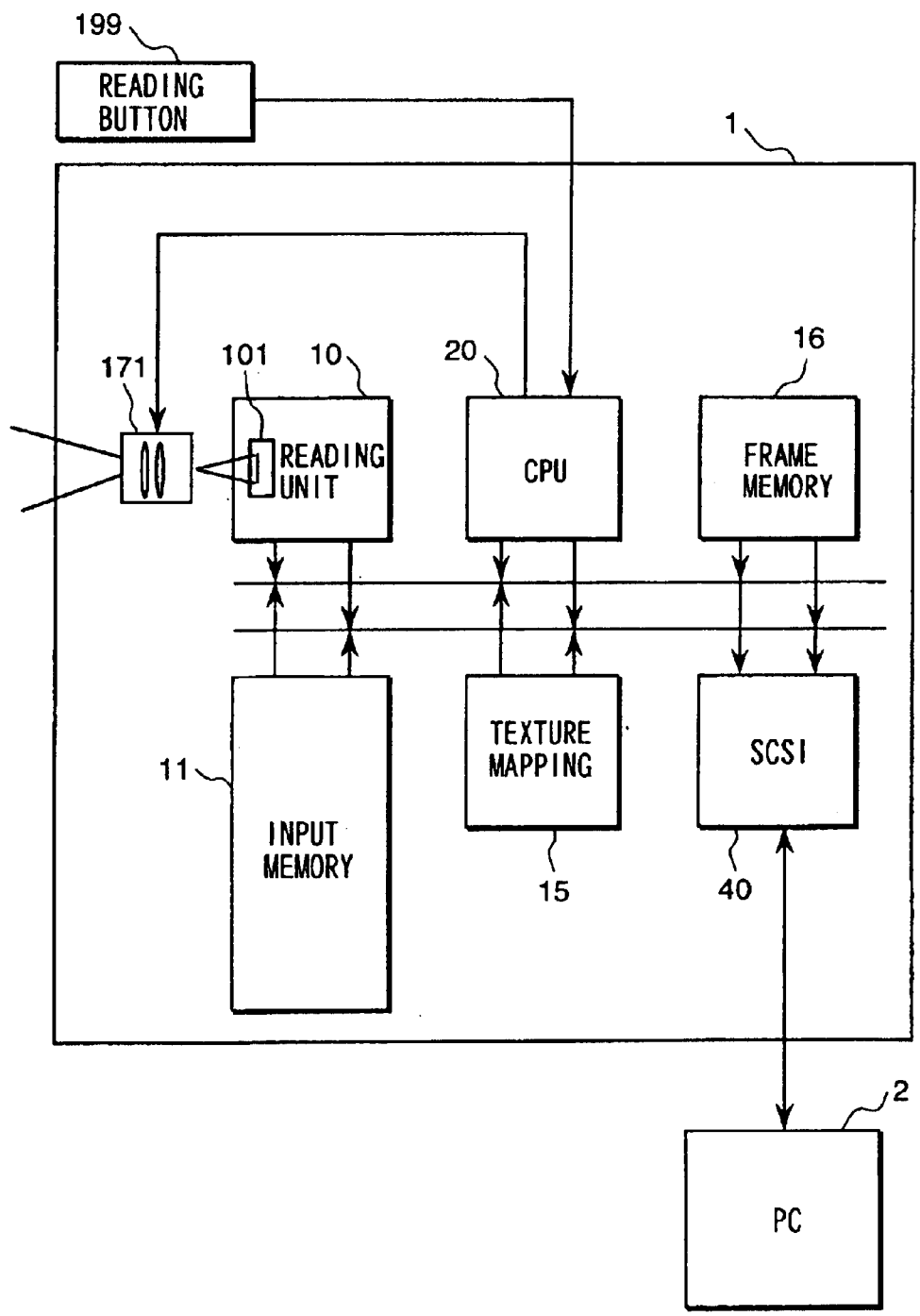
FIG. 2 is a block diagram showing an embodiment of a scanner in accordance with the present invention.

FIG. 2 shows a block diagram of the scanner 1 of the present invention.

The function explained above is actually realized in the scanner 1 shown in FIG. 2. The processing range is extensive, and to the extent that the processing content is simple and a high speed processing is necessary, the processing range is limited by the hardware, and, since the processing time may be long and complicated, the processing is realized by the software of a CPU 20.

A target document image is subjected to photoelectric conversion by a linear sensor 101 of the reading unit 10 via a lens 171 and is transferred to the input memory 11. The CPU 20 calculates the distance and factor, sets parameters in the texture mapping unit 15, and develops the processed image in the frame memory 16. The frame memory 16 is divided into a plurality of areas, and data can be transferred asynchronously to the personal computer 2 via an interface unit 40, such as an SCSI. The start of these processes is initiated by actuation of a reading button 199.

By use of such a scanner configuration, a complicated calculation can be executed by the CPU 20 and a process requiring a high processing speed can be executed by the hardware, so that an effect is obtained in that a system low in cost can be provided. Since it is not necessary to synchronously execute the scanning process and the reading process by the personal computer 2, an effect is obtained in that a standard interface, such as an SCSI, can be used, and it can be directly connected to the personal computer 2.

Figure 3:
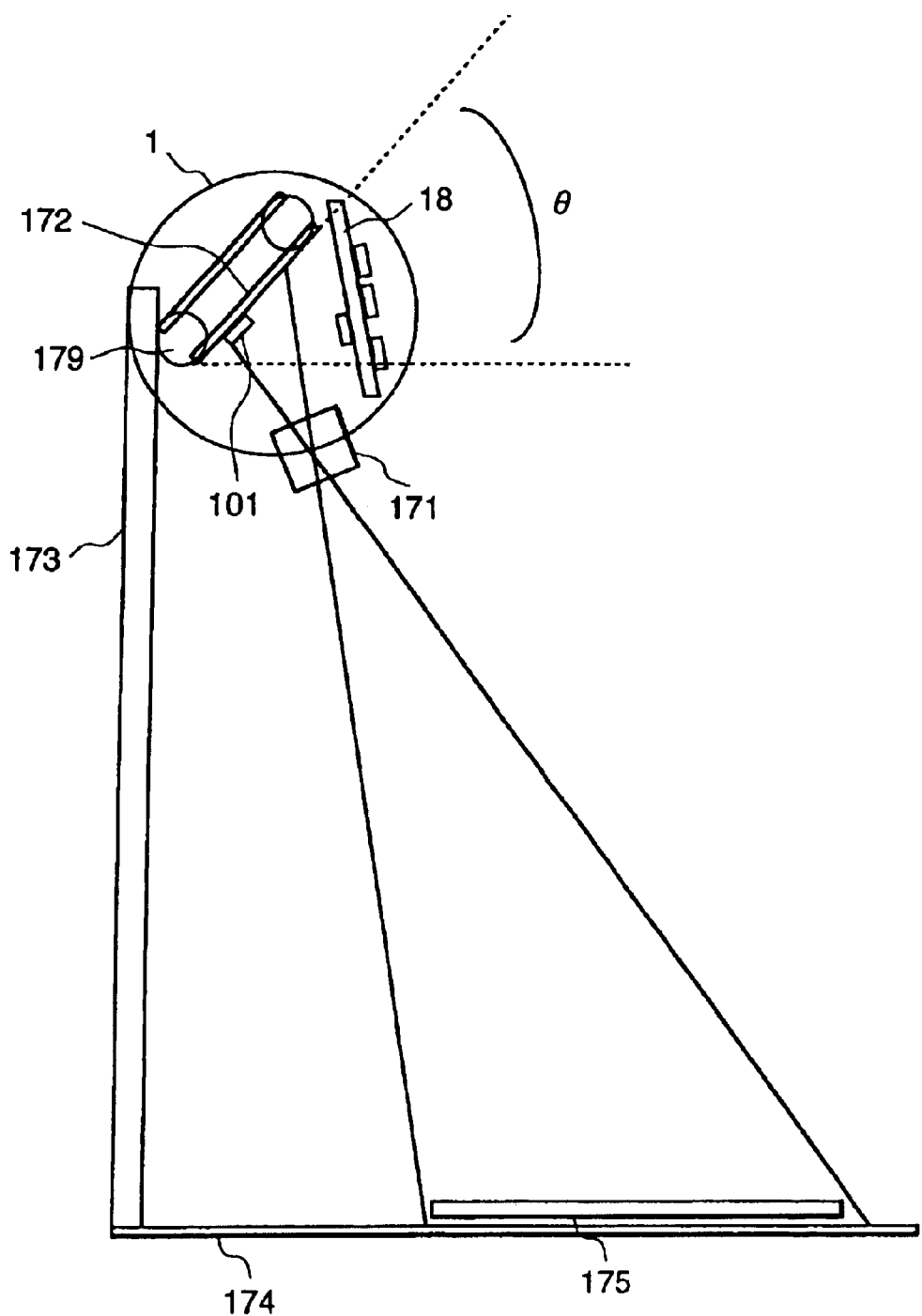
FIG. 3 is a diagram showing side view of the non-contact image reader of the present invention.

FIG. 3 shows an external view of the scanner 1. The scanner 1 is housed in a frame having a spherical shape for the purpose of reading a document 175 disposed on a document stand 174 via a lens 171, and a linear sensor 101 is attached onto a moving part 172 driven by a pulse motor 179. The sub-scan movement is realized by moving the linear sensor 101. In this case, when the document is read from right above the document, the document is parallel with the moving surface of the sensor. However, when it is read from right above, the sensor is in a position where it becomes an obstacle for a user and the installation may be difficult generally. For this reason, the document typically is read obliquely from above. Therefore, to fit the focal position to the image plane, the movement of the linear sensor 101 has a swing angle of θ for the document. The hardware of the processing unit is mounted on a control board 18 and is housed in the same spherical frame. A support bar 173 fixes the scanner 1, and an interface cable to the personal computer 2 is installed along the support bar. By use of such a configuration, since the reading unit is not installed right above the document, an effect is produced that there is little possibility that the head of a user comes in contact with the reader by mistake, and the operability is thereby improved.

Figure 4:
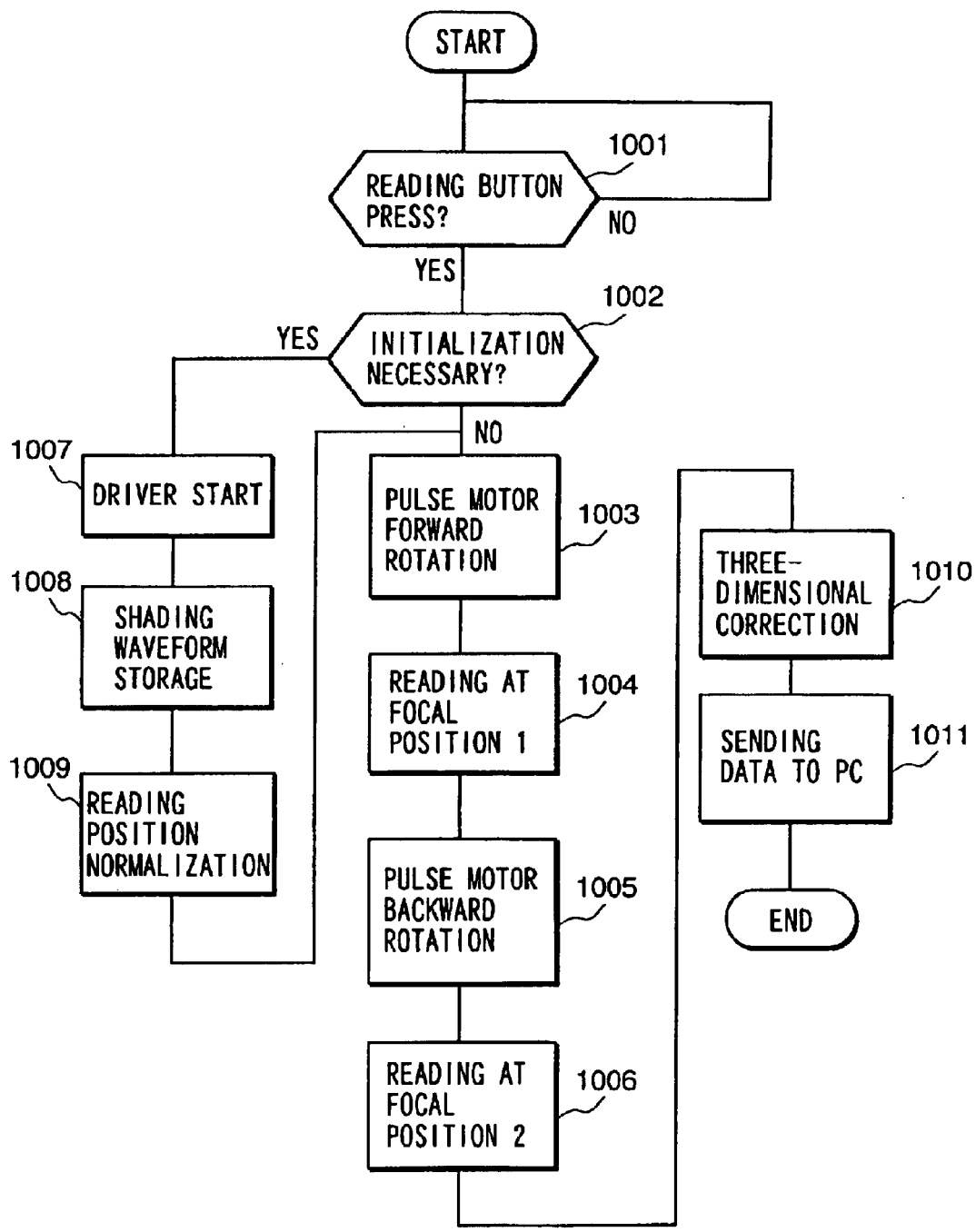
FIG. 4 is a flow diagram for explaining the reading operation of the scanner of the present invention.

FIG. 4 shows the flow of the reading operations performed by the scanner 1 in which including the reading unit 10 is incorporated. When the reading button is pressed (Step 1001), the scanner 1 determines whether initialization is necessary or not (Step 1002), and, when it is necessary, the scanner 1 executes initialization. The initialization includes starting the scanner driver in the personal computer 2 (Step 1007), storing the shading waveform (Step 1008), and normalizing the reading position using a standard mark (Step 1009). When the normalization is finished, the scanner 1 stores a flag indicating an end of the normalization.

Next, the scanner 1 rotates the pulse motor 179 in a forward direction (Step 1003) and reads data at the first focal position (Step 1004). By this operation, the scanner 1 inputs an image with the document surface in focus. When the scanner 1 next scans the reading area, it rotates the pulse motor in a backward direction (Step 1005) and reads data at the second focal position (Step 1006). The focal position is adjusted so that a document having a thickness can be clearly read. If necessary, the scanner 1 changes the reading conditions, such as the focal position and swing angle, and inputs images. The scanner 1 measures the distance from these images, executes a three-dimensional correction (Step 1010), and sends data to the personal computer 2 (Step 1011).

By use of such an arrangement and procedure, an effect is produced in that images can be read while changing the reading conditions for the forward and backward scans, and the overhead for distance measurement can be reduced. Another effect that is produced is that, when the reading button is mounted on the scanner, immediately after the reading position of the scanner is adjusted, an efficient positioning arrangement can be realized and the operability can be improved.

Figure 5:
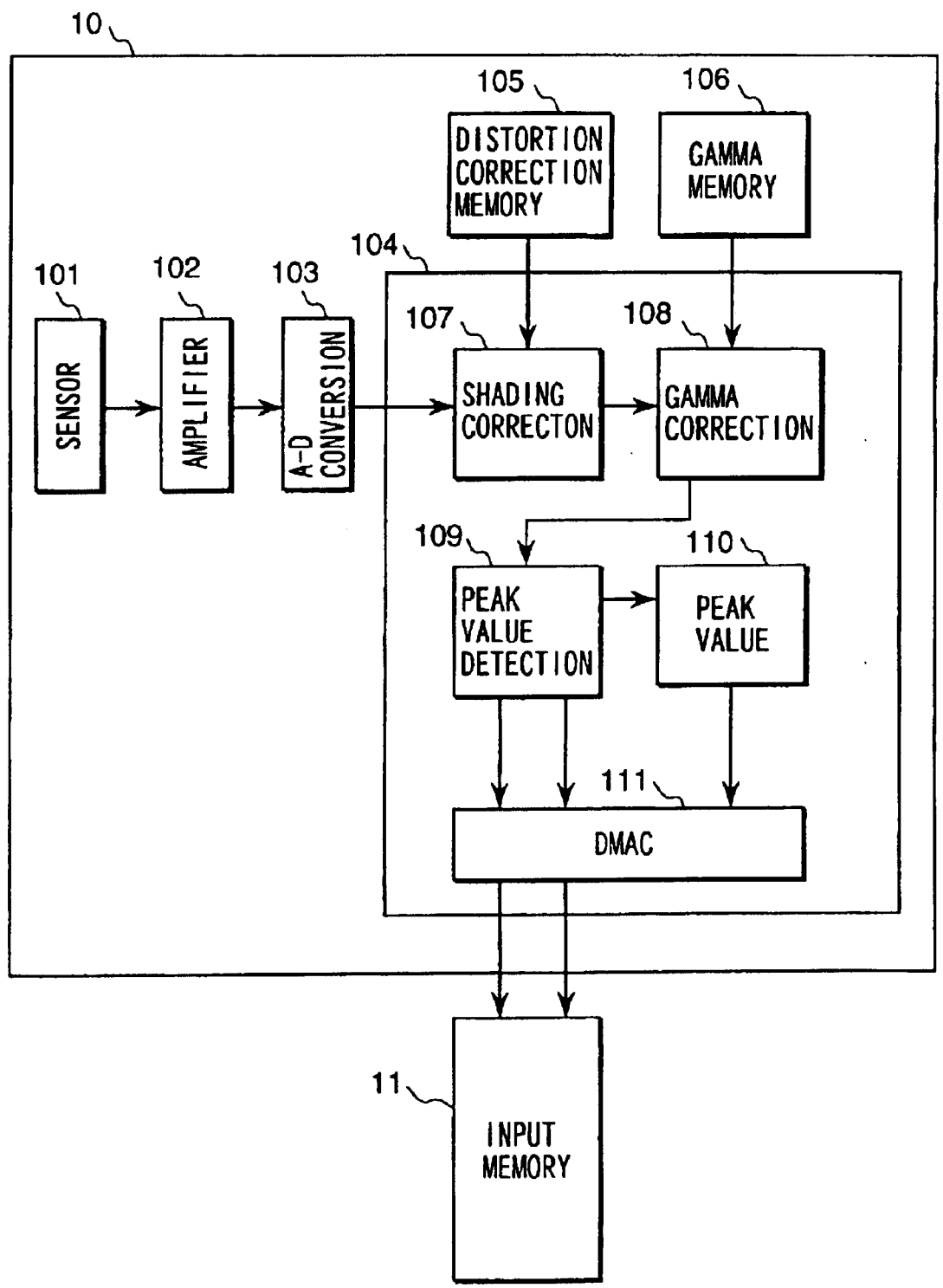
FIG. 5 is a block diagram showing an embodiment of a reading unit of the present invention.

FIG. 5 shows a detailed block diagram of the reading unit 10. The linear sensor 101 photoelectrically converts an optical signal received from a document to an analog electric signal in units of one line, and this analog electric signal is amplified by an amplifier 102 and converted to digital data by an A-D converter 103, after which the data is transferred to a distortion correction LSI 104. The distortion correction LSI 104 stores image data, representing an image on white paper, in a distortion correction memory 105 beforehand and corrects the distortion in the digital data using a shading correction unit 107 by accessing the image data at the time of reading. Next, a gamma correction unit 108 corrects the linearity according to a conversion table stored in a gamma memory 106. In the gamma memory 106, there is a table which is inversely converted so as to read a gray chart in which the density is gradually changed by the sensor and to output a signal in proportion to the density. Thereafter, a peak value detection unit 109 stores the maximum brightness value in the line as a peak value 110 and writes it in the input memory 11 together with the line data via a DMAC (direct memory access control) 111. The DMAC 111 issues the storage address into the memory for the processed data and writes the data into a predetermined area.

By use of such a configuration and procedure, an effect is produced whereby flickering of a fluorescent lamp is read as a peak value with which the flickering can be corrected, so that a highly precise image can be obtained.

Figure 6A:
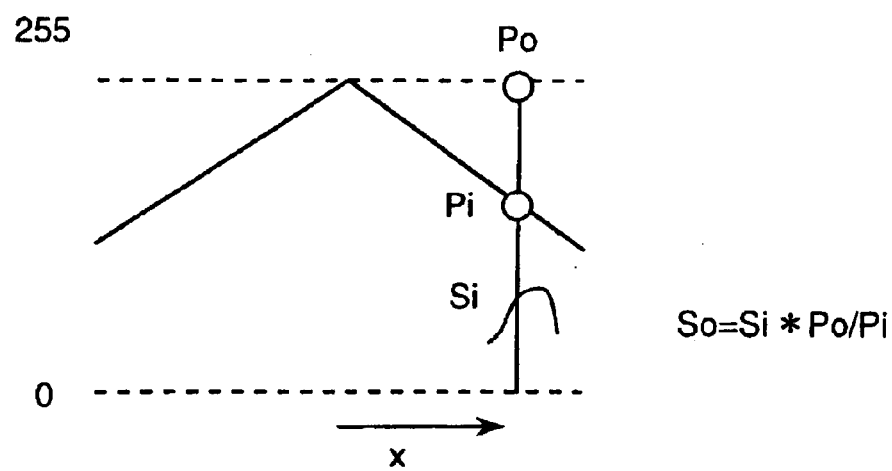
FIGS. 6(a) and 6(b) are diagrams used for explaining the principle of operation of the shading correction unit of the reading unit of the present invention.
Figure 6B:
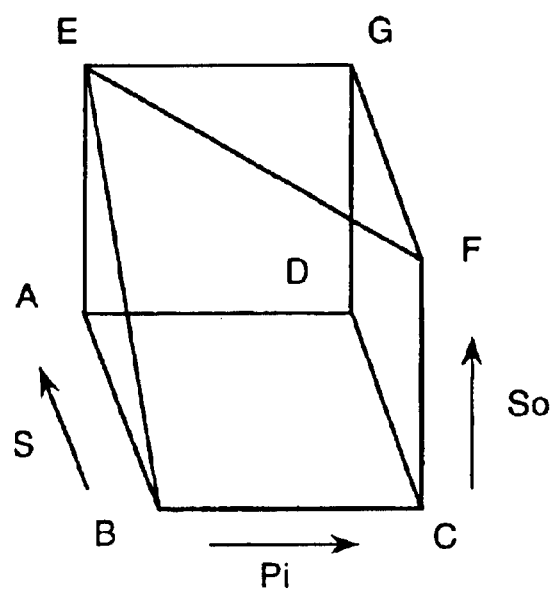

FIGS. 6(a) and 6(b) show the principle of operation of the shading correction unit 107. Shading correction is a process of, for example, normalizing a signal based on reading a white paper as a reference white level. The process is performed so as to correct a variation that occurs when a document is read, in which the central part is bright and the peripheral parts are dark, as well as to correct variations in the sensitivity of the sensor for each dot.

FIG. 6(a) is a conceptual diagram showing a state when input data Si at the time of document reading is corrected by shading data Pi, which represents a white paper reading signal. Po is a normalization reference value and it may be considered as a maximum value of the range. Data So after normalization can be represented as Si*Po/Pi. In this case, one multiplication operation and one division operation are carried out, so that execution of these operations requires a lot of time. Therefore, using the conversion table shown in FIG. 6(b), correction is executed by indexing of a sample table. In the table, when all results So are calculated and stored for the input data Si and the shading data Pi, at the time of processing, it is desirable to access the table using two parameters, such as the input data Si and the shading data Pi. By use of such a table, an effect is produced in which correction can be realized at high speed without using excessive logic, such as employed by a divider.

Figure 7A:
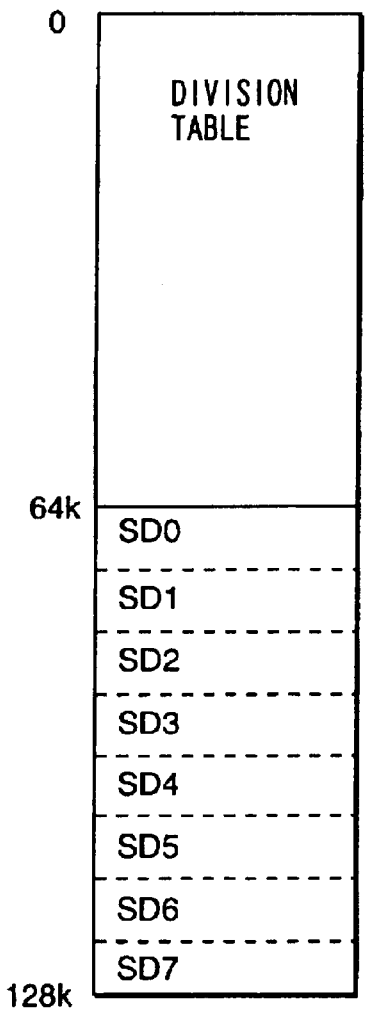
FIGS. 7(a) to 7(c) are diagrams showing, respectively, an embodiment of the conversion table of the distortion correction memory of the reading unit, waveforms for sub-scan block positions and a timing chart of table access according to the present invention.
Figure 7B:
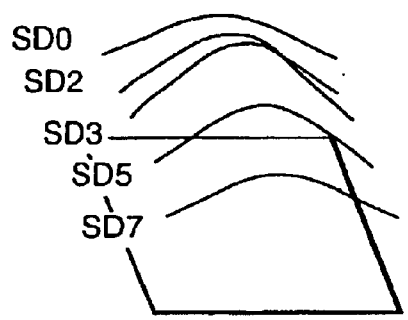
Figure 7C:
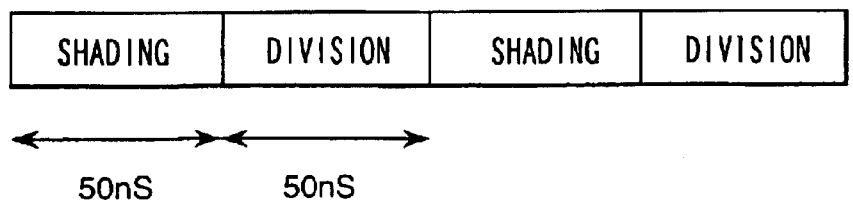

FIGS. 7(a) to 7(c) show the constitution of the conversion table in the distortion correction memory 105 of the reading unit 10. FIG. 7(a) shows an example of the address map thereof. For example, it is assumed that the table is divided into a 64 k-word division table area (0 to 64 k words) for storing division results of 8 bits/8 bits and an area (64 k to 128 k words) for storing shading data indicating read data of white images for each line. The shading data area is further divided into small parts, and, as shown in FIG. 7(b), it stores the waveform for each sub-scan block position. For example, the shading waveform SD0 indicates the shading waveform in the neighborhood of the reading start line and SD7 indicates the shading waveform in the neighborhood of the reading end line which is represented three-dimensionally. SD2 to SD5 indicate the shading waveforms on the lines in the intermediate positions thereof. The division amounts are determined from the characteristics of the optical system beforehand. By doing this, a correction is effected that the shading waveform greatly differs depending on the line, due to the exposure of illumination and the characteristics of the lens.

FIG. 7(c) shows a timing chart of table access. The shading data reading and division table retrieval operations are alternately repeated every 50 ns in correspondence to a 10-MHZ sensor data input. These plurality of shading waveforms can be corrected using the shading waveform in the neighborhood of the reading line by switching and reading them according to the reading line position.

By use of such a procedure, an effect is produced in that, by storing a plurality of shading waveforms and switching and reading them, even under a reading condition of a two-dimensional light quantity distribution, highly accurate corrections can be realized and images of high quality can be obtained.

Next, three-dimensional correction will be explained.

Figure 8:
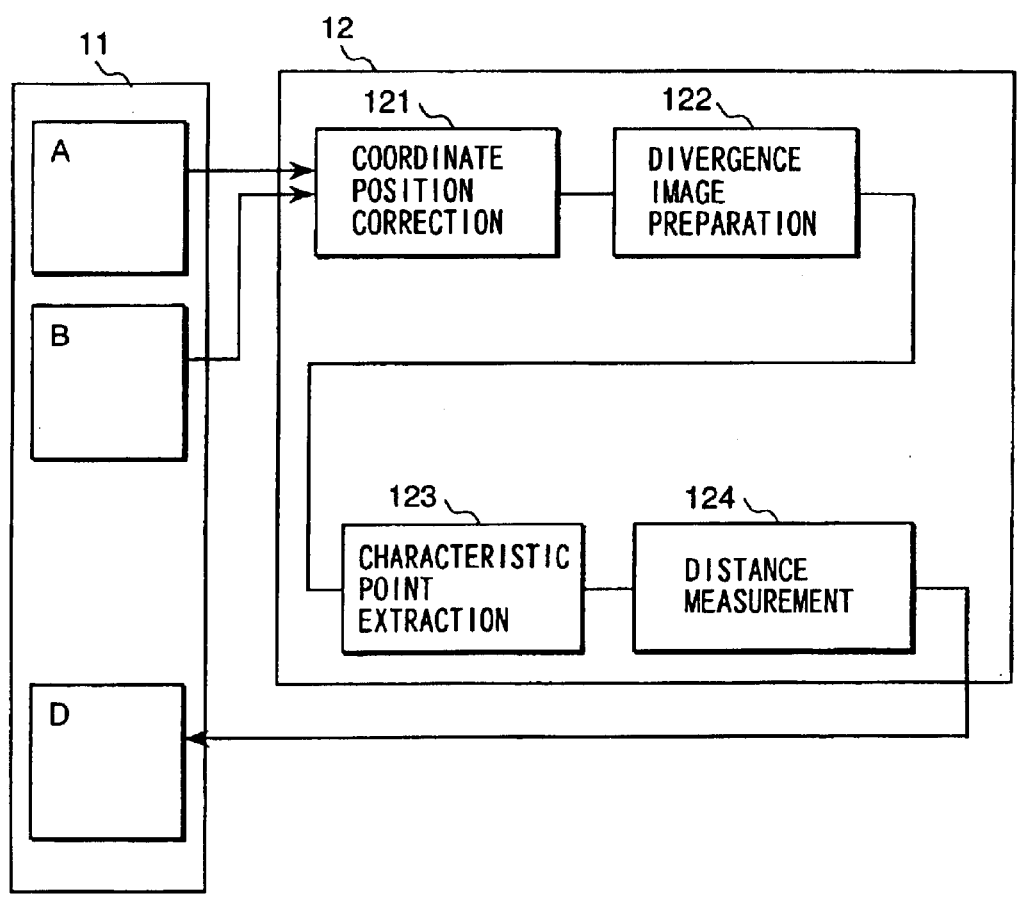
FIG. 8 is a block diagram showing an embodiment of a distance measuring unit for measuring each characteristic point in accordance with the present invention.

FIG. 8 is a block diagram showing the outline of the distance measuring unit 12 for each characteristic point for three-dimensional correction. Using a plurality of image data A and B in the input memory 11, the coordinate position is corrected by a coordinate position correction unit 121, and divergence images for detecting the deviation between images are prepared by a divergence image preparation unit 122. Then, characteristic points are extracted from the divergence images by a characteristic point extraction unit 123, and the distance is measured for the characteristic points by a distance measuring unit 124, after which distance data D for each characteristic point is prepared and stored in the input memory 11.

Firstly, the coordinate position correction unit 121 corrects for changes in the magnification and reduction ratios caused by changes in the focus. To obtain them, when a reference point line is prepared beforehand, and images are read by changing the focus, and diffusion characteristics thereof and diffusion values are compared, the characteristics can be easily determined. Namely, the scale of images read by changing the focus changes depending on the focus, so that a correction for fitting the scale is performed. For this correction factor, by reading a plurality of images of a fixed pattern beforehand, by changing the focus and measuring the distance between the reference points in the pattern and the diffusion condition which are obtained as a result, the characteristics can be easily determined. Next, the divergence image preparation unit 122 calculates the diffusion value between a plurality of images. The divergence image is used to determine the difference between pixel data at the same pixel position (characteristic point) in a plurality of images. Concretely, it is a method for obtaining a determination by comparing the square of the difference between image data with the difference between the squares of pixel data. Next, when the characteristic point extraction unit 123 compares the diffusion value with a specific threshold value, characteristic points can be easily extracted when the scattered image data is at a level greater than a preset threshold value, that is, when the deviation between images is large. In this case, for example, the end of a piece of paper isolated may be cited as a candidate.

By use of such a procedure, an effect is produced in that the distance measurement can be realized only from a plurality of images under different reading conditions and a special distance sensor is not necessary.

Figure 9A:
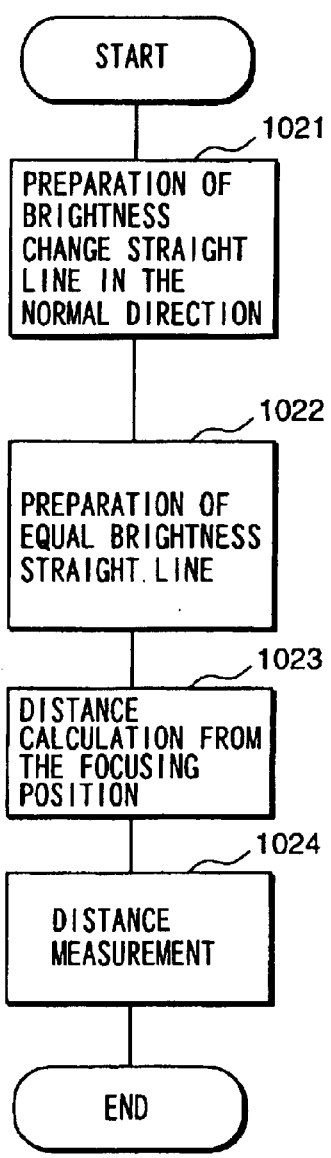
FIG. 9(a) is a flow diagram and FIGS. 9(b) and 9(c) are diagrams used for explaining the distance measuring unit for measuring each characteristic point in accordance with the present invention.
Figure 9B:
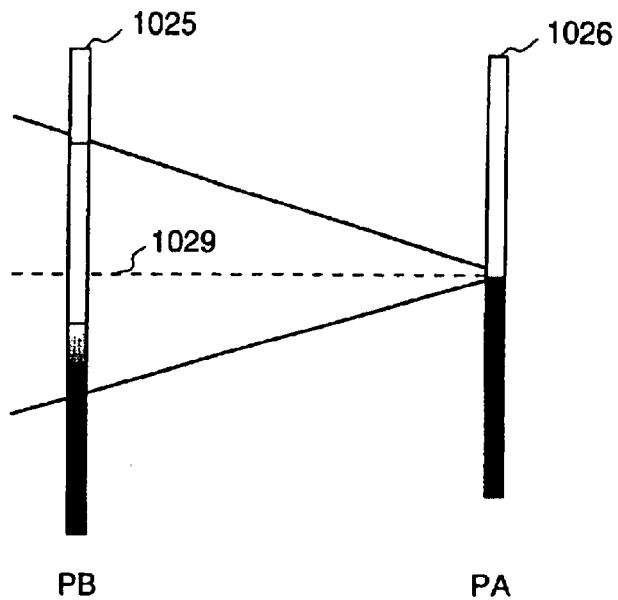
Figure 9C:
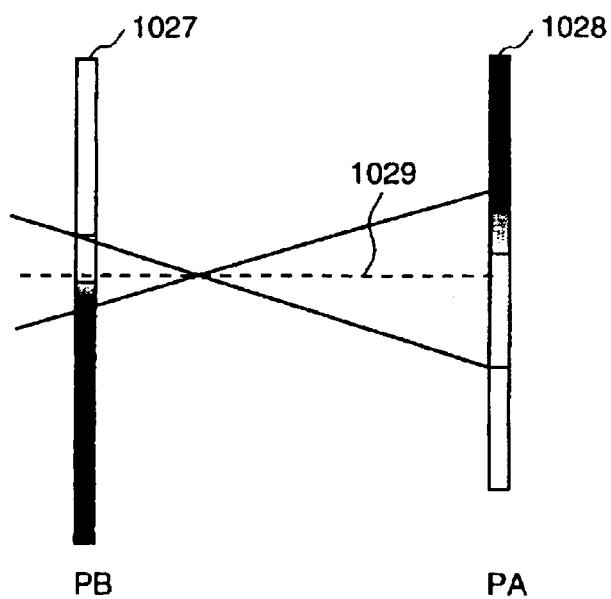

FIG. 9(*a*) is a flow diagram of the operation preformed by the distance measuring unit 124 in the distance measuring unit 12 for each characteristic point. Firstly, brightness change straight lines in the normal direction orthogonal to the characteristic point line are prepared so as to be normal to the light axis 1029 (Step 1021), and an equal brightness straight line connecting the same brightness is prepared using them (Step 1022). Then, the distance between the focusing position and the camera is calculated (Step 1023), and three-dimensional position information is calculated from the positional relationship thereof (Step 1024).

FIGS. 9(*b*) and 9(*c*) are diagrams conceptually indicating how images are observed depending on the focal position of the optical system and the document reading position. PA and PB indicate the positions where documents are placed and the documents are read from the left side, which is not shown in the drawing. Each dotted line shown in the drawings indicates the optical axis, and each solid line indicates a part of the light flux, which is focused at the focal position.

FIG. 9(*b*) shows an image when the document is put in the reading position PA and the focus of the optical system is positioned at PA and the boundary between white and black can be read without diffusion, as shown in a read image 1026. When the same focal position is set and the document is put in the position PB, the boundary of the document between white and black is diffused and the read image is an image in which the boundary is not clear, as shown in 1025. In this case, when the read image 1026 is used as it is, a good image can be obtained.

FIG. 9(*c*) shows a case wherein the focal position is in the neighborhood of the reading position PB of the document and at both document reading positions PA and PB, the boundaries are diffused as shown in the read images 1027 and 1028. In this case, by forming an image using these two read images 1027 and 1028, an output image of high quality is provided.

By use of such a procedure, an effect is produced whereby the distance data can be measured with a high accuracy from images having different focuses.

Next, the function of the focus correction factor calculation unit 13 will be described in detail.

Figure 10A:
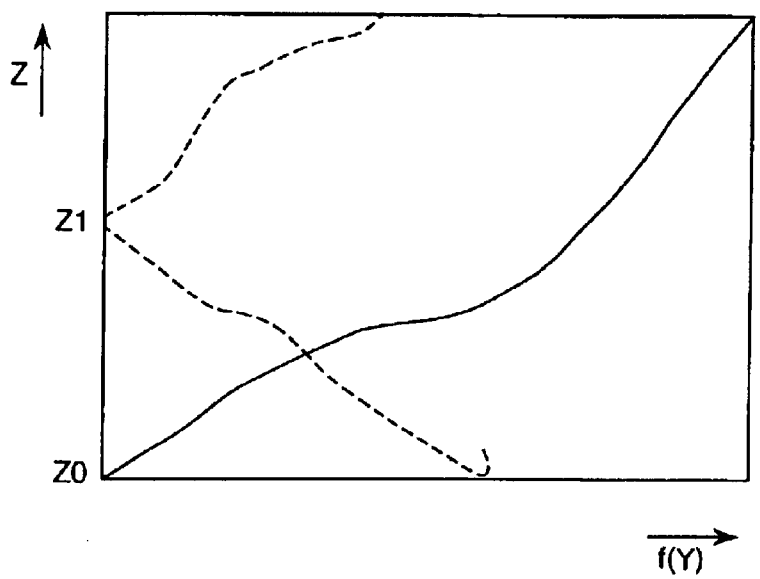
FIGS. 10(a) and 10(b) are graphs used for explaining the principle of operation of a focus correction factor calculation unit of the present invention.
Figure 10B:
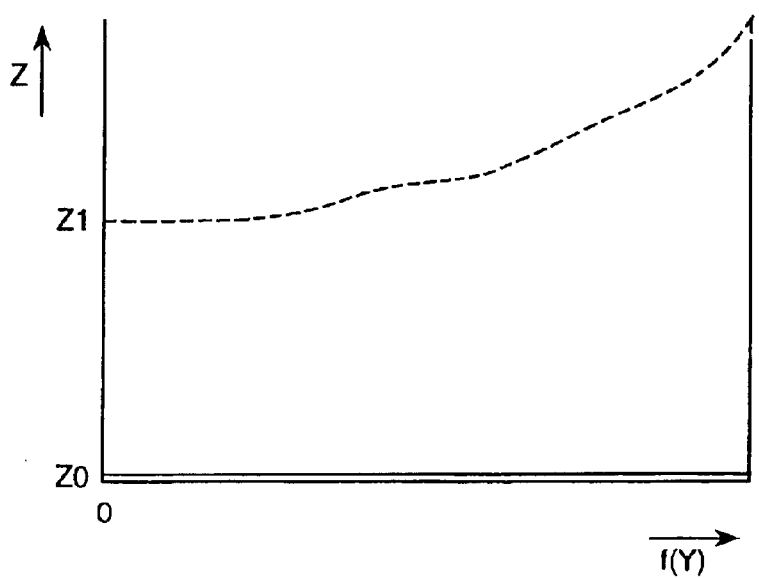

FIG. 10(*a*) is a conceptual diagram showing how the diffusion f(Z) of the line is changed at the characteristic points in the image read at the height Z of an image of a document isolated from the document stand. In this case, the diffusion f(Z) may be considered as a line width when a scattered image is binary-coded by a preset threshold value. The unit is the number of dots of a pixel.

Assuming the height of the first focal position as Z0 (distance data) and the height of the second focal position as Z1, the diffusion width of the image at the first focal position is changed as shown in the graph of FIG. 10(*a*) by a solid line and increases monotonously. The diffusion width of the image at the second focal position is changed as shown in the graph by a dashed line, and it has a shape similar to a curve of secondary degree having a minimum value at Z1. Using this graph, the distance can be inferred from the diffusion amounts of a plurality of images. FIG. 10(*b*) shows how the focal positions Z0 and Z1 are changed depending on the subscanning position Y. Since the reading system has a swing angle, Z0 does not depend on the Y position. However, when the focal position is changed, Z1 changes as shown in the drawing by a curved surface. Therefore, for Z1 the correction of distance calculation is necessary according to the sub-scanning position Y.

Next, the fluoroscopic correction distance calculation unit 14 will be described.

Figure 11A:
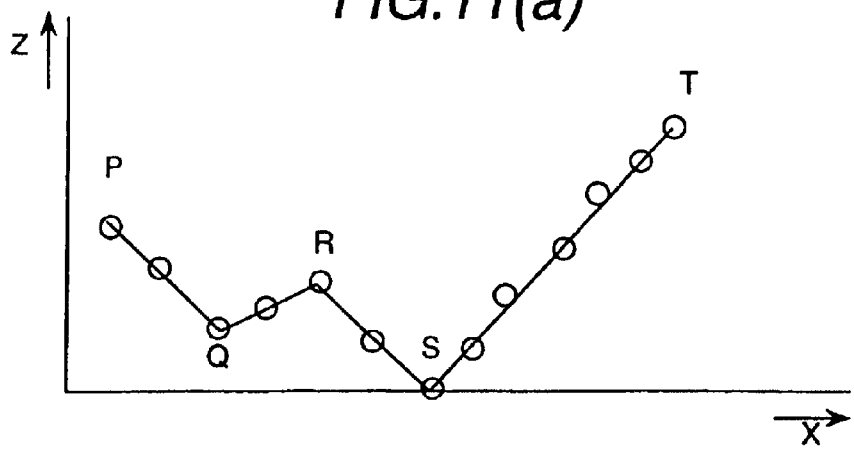
FIGS. 11(a) to 11(c) are two-dimensional conceptual diagrams of the output of a fluoroscopic correction distance calculation unit of the present invention.
Figure 11B:
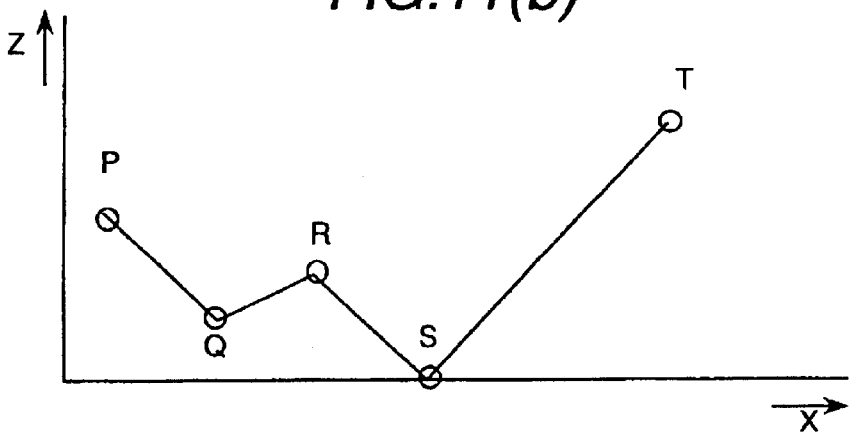
Figure 11C:
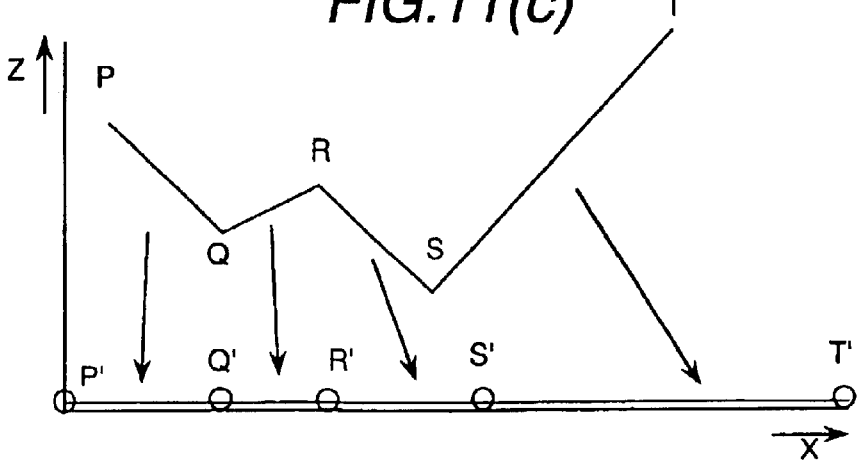

FIG. 11(*a*) is a graph of the results of a distance calculation by the fluoroscopic correction distance calculation unit 14. In this diagram, the distance data at the characteristic point at a certain sub-scanning position is mapped. Originally, as mentioned above, the distance data Z is calculated for each of the characteristic points (points determined to have a displacement which is large in the scattered images) distributed two-dimensionally. However, for simplicity of explanation here, the distance data Z in the X direction is indicated by a circle and the distribution of measuring points is indicated. Firstly, the measuring points are approximated by a straight line, and, as shown in FIG. 11(*b*), only the end points P, Q, R, S, and T of the straight line are extracted and the distance between the end points as a route distance is measured. However, for example, the distance between the end points P and Q is observed on the read image data in a state in which it is mapped onto the X axis, and the paper is actually tilted, so that the distance may be short when the distance between the end points P and Q on the paper is measured, for example, using the three-square theorem, the route can be determined. According to this distance, on the basis of the reference point P' as shown in FIG. 11(*c*), the distance data is aligned and developed on a plane in accordance with the position information developed at each end point, like the end points Q', R', S', and T', according to each route distance. In this case, the texture mapping art used in three-dimensional graphics can be applied.

Figure 12A:
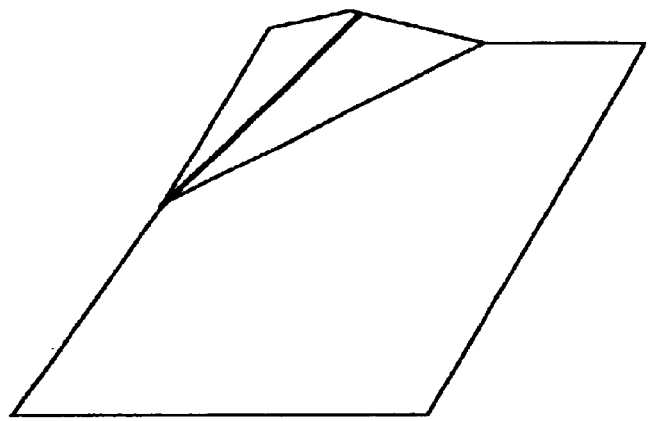
FIGS. 12(a) to 12(c) are three-dimensional conceptual diagrams of the data of the fluoroscopic correction distance calculation unit, as seen in FIGS. 11(a) to 11(c), when extended in a plane.
Figure 12B:
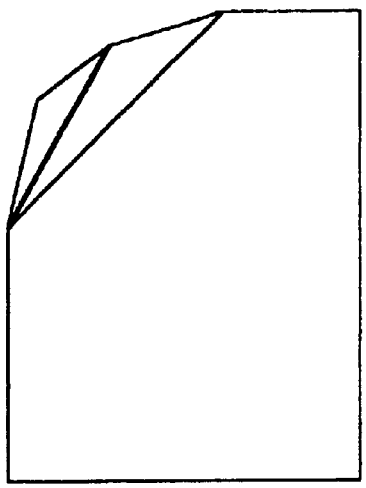
Figure 12C:
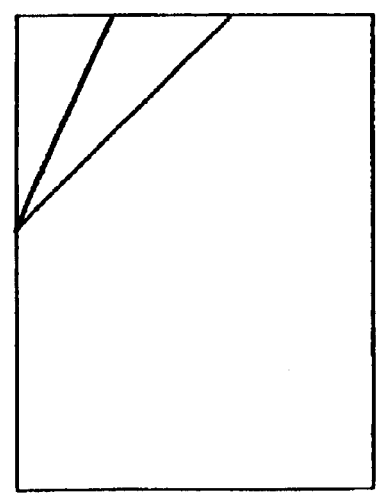

FIGS. 12(*a*) to 12(*c*) show one example of a conceptual diagram wherein the data of that FIGS. 11(*a*) to 11(*c*)) are extended on a plane. When a form folded as shown in FIG. 12(*a*) is observed from above, it is seen as shown in FIG. 12(*b*). However, when the two-dimensional distance calculation explained with reference to FIGS. 11(*a*) to 11(*c*) is extended to a three-dimensional calculation, and the distance is calculated according to the distance information, and the distance data is developed on a plane, a composite image as shown in FIG. 12(*c*) is obtained. By doing this, a folded form and characters written on a bent curved surface are pressed against the plane and a composite image observed from the front can be obtained.

Figure 13:
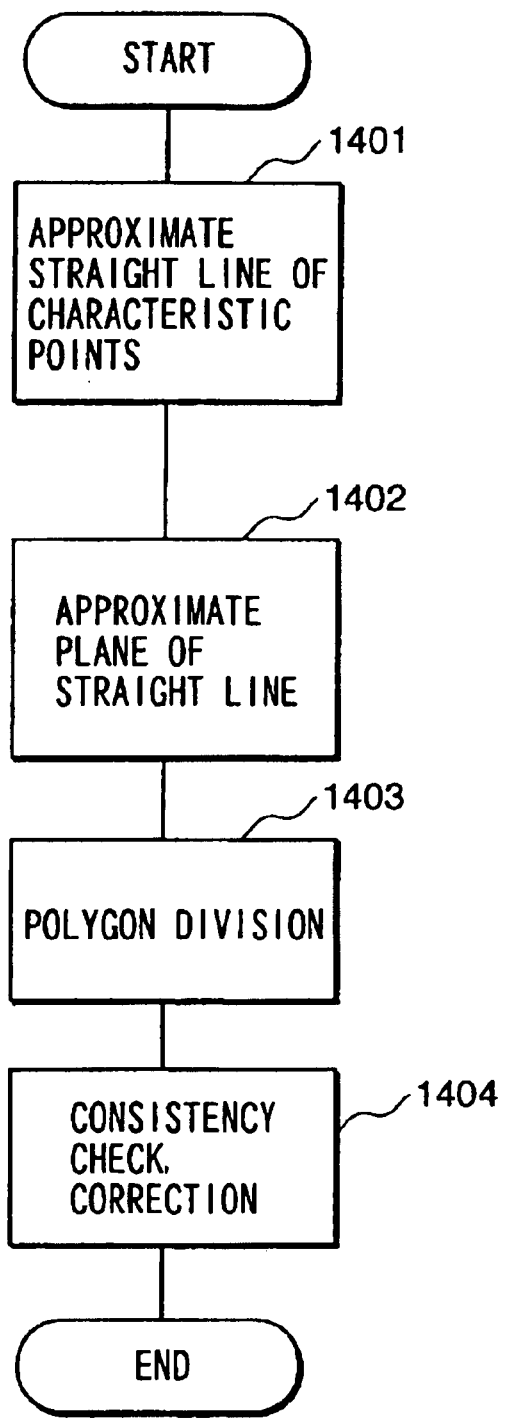
FIG. 13 is a flow diagram used for explaining the processing procedure of the fluoroscopic correction distance calculation unit of the present invention.

FIG. 13 is a processing flow diagram, showing the operation of the fluoroscopic correction distance calculation unit 14. The distance data of characteristic points is input, and the characteristic points are approximated by a straight line, as explained with reference to FIGS. 11(*a*) to 11(*c*) (Step 1401), whereby distance data with unnecessary characteristic points deleted are generated. Next, as explained with reference to FIGS. 12(*a*) to 12(*c*), an approximate plane created by these characteristic points is prepared (Step 1402). In this case, a process of selecting three neighboring points, calculating the distance between the plane comprising the points and the peripheral characteristic points of the aforementioned three points, and, when it is smaller than a preset threshold value, approximating and merging it with the aforementioned plane, is repeated. These are approximated to a triangle and described as a polygon (Step 1403), and the consistency of the coordinate relationship and connection relationship is checked and corrected, and the development factors, such as the coordinate position and magnification and reduction ratios for texture mapping from a three-dimensional model prepared by the distance data to the two-dimensional document stand plane, are calculated (Step 1404).

Approximating characteristic points of a so-called uneven document to a straight line, calculating the distance of a tilted straight line, extending it on a plane, and developing the data in a state in which a horizontal document free of irregularities is read as though from right above are executed for each polygon and an image of high quality is obtained.

By use of such a processing, an effect is produced whereby an image can be developed on a plane using the distance data obtained from characteristic points, even on a folded form or on the surface of a thick book, whereby a document can be accurately corrected and read.

Next, fluoroscopic conversion will be described. According to this embodiment, fluoroscopic conversion is calculated by the aforementioned fluoroscopic correction distance calculation unit 14 and executed by the texture mapping unit 15. In this case, a document is read obliquely from above, instead of from directly above, so that the near portion appears to be large and the far portion appears to be small. Fluoroscopic conversion converts it so that it appears as if the document has been observed from the front.

Figure 14A:
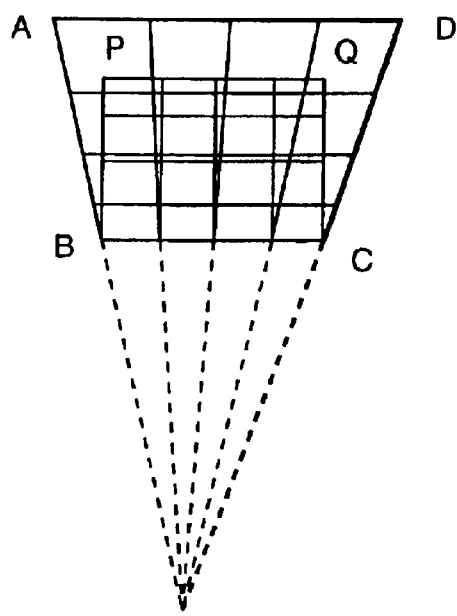
FIGS. 14(a) and 14(b) are diagrams for explaining the principle of fluoroscopic conversion in accordance with the present invention.

FIG. 14(*a*) is a conceptual diagram showing fluoroscopic conversion. Assuming that an image observed from the front is a rectangle PBCQ, when it is observed obliquely from above, it is seen as a rectangle ABCD. The side AD is the near side and the side BC is the far side. An obliquely reading optical system is designed so that the reading resolution is guaranteed even for the far side, so that if the side BC is shared, the side AD is longer than the side PQ and the side AB is also longer than the side PB. The purpose of fluoroscopic conversion is to convert the observed rectangle ABCD to the rectangle PBCQ. FIG. 14(*b*) shows the variable definition for conversion. The length of the side AD is assumed to be Src_Width, the length of the side BC is assumed to be Dest_Width, the difference between the coordinate A and coordinate B in the x direction is designated Dx_Left, and the difference between the coordinate A and coordinate B in the y direction is designated Dy_Left. The hatched part is the reading area.

Figure 15:
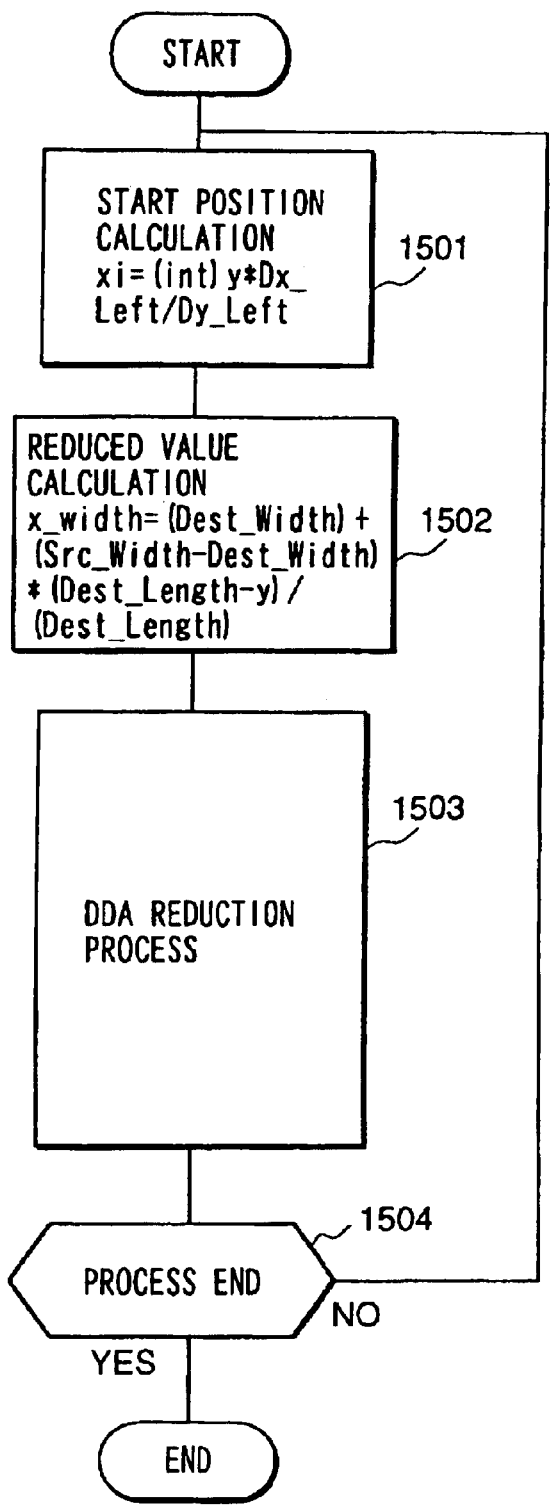
FIG. 15 is a flow diagram for explaining the processing procedure for fluoroscopic conversion in accordance with the present invention.

FIG. 15 is a flow diagram of fluoroscopic conversion. Firstly, the image reading start position in the reading area in the input memory 11 is calculated (Step 1501). The start position Xi is the point A first and it is a function of the sub-scanning line y and represented by y*Dx_Left/Dy_Left. Next, since it is necessary to set the length uniformly to Dset_Width in line units, the reduction ratio is calculated for each line (Step 1502). For that purpose, the length of the target line x_width is calculated first. It can be represented by the following using brief proportional calculation:

$$x\_width = (Dest\_Width + ((Src\_Width - Dest\_Width) * (Dest\_Length - y)/Dest\_Length)).$$

The reduction ratio is Dest_Width/x_width. However, a calculation using a decimal point takes time, so that a DDA (digital differential analyzer) is used for actual processing (Step 1503). Thereafter, whether the reduction process is to end or not is judged (Step 1504), and, when it is not to end, the aforementioned process is repeated once again.

By use of such a constitution, an effect is produced that the texture mapping process, which typically takes a significant time, can be realized by simple hardware, and a high-speed processing system low which is in cost can be provided.

Figure 16A:
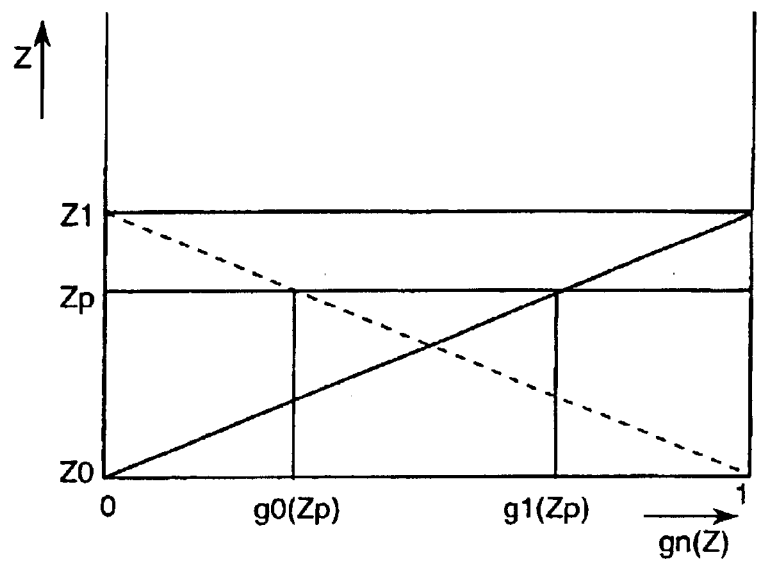
FIG. 16(a) is a graph and FIG. 16(b) is a block diagram showing an embodiment of a texture mapping unit of the present invention.
Figure 16B:
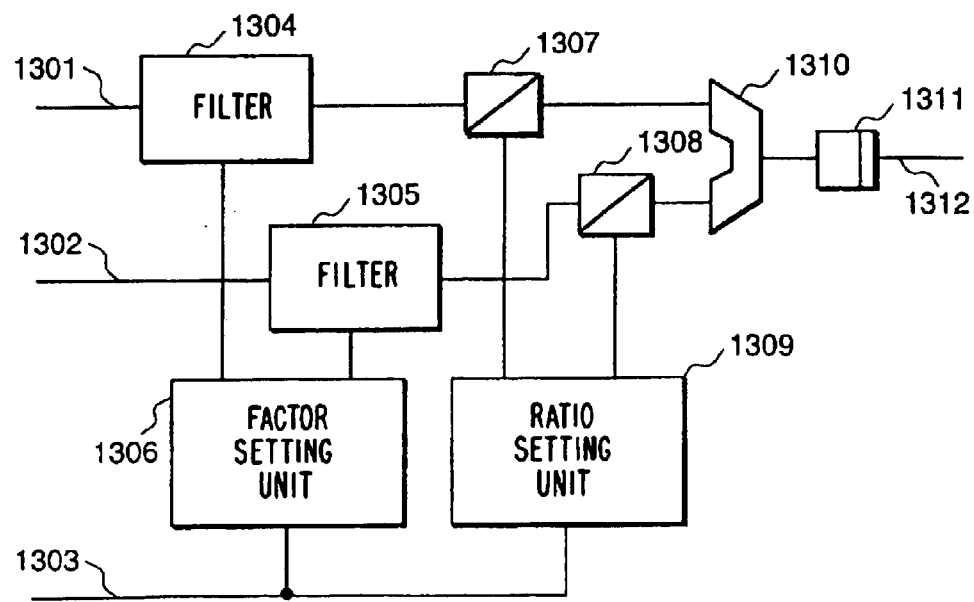

FIGS. 16(*a*) and 16(*b*) illustrate features of the image composition system of the texture mapping unit 15. FIG. 16(*a*) is a graph indicating the mixture ratio of an image g0(Z) at the first focal length Z0 and an image g1(Z) at the second focal length Z1 relative to the distance data Z between the measured lens position and the characteristic point of a document. The dashed line from z1 on the axis Z to 1 on the axis gn(Z) indicates the mixture ratio of an image g1(Z) at the first focal length Z1 for the distance data Z, and the straight line from Z1 on the axis Z to 0 on the axis gn(Z) indicates the mixture ratio of an image g0(Z) at the second focal length Z0 for the distance data Z. When the focal length is Z0, only the image g0(Z) at the first focal length Z0 may be used and when the focal length is Z1, only the image g1(Z) at the second focal length Z1 may be used. If the focal length is between Z0 and Z1, the image g0(Z) at the first focal length Z0 and the image g1(Z) at the second focal length Z1 may be used equally. Generally speaking, when the focal length is Zp, by mixing an image g0(Zp) at the first focal length and an image g1(Zp) at the second focal length, an output image is generated.

In the aforementioned embodiment, an example in which images at two different focal lengths are read, and an image is composed is indicated. However, the present invention also can be applied to a case in which images at not only two different focal lengths, but also at a plurality of different focal lengths, are read. When a plurality of images are read at focal lengths which represent a plurality of different reading conditions, and when the aforementioned image composition is preferably performed using two focal lengths across the focal position where a document is actually put, an image of high quality with little noise can be obtained.

In the aforementioned example, the focal length is used as a reading condition. However, even when the swing angle θ is used, the same effect as the aforementioned can be obtained.

FIG. 16(*b*) is a block diagram of the image composition unit. An image 1301 at the first focal length is read out of the input memory 11, and the ratio is adjusted by a distributor 1307 via a diffusion correction filter 1304 for correcting the diffusion of the image 1301. Similarly, an image 1302 at the second focal length is read out of the input memory 11, and the ratio is adjusted by a distributor 1308 via a diffusion correction filter 1305 for correcting the diffusion of the image 1302. The two adjusted images are then composed by an adder 1310, and the timing is adjusted by a latch 1311, from which an output signal G_Out 1312 is output. The diffusion correction filters 1304 and 1305 are filters for correcting a diffusion generated in an image according to the distance, and an edge emphasizing filter can be generally used for this purpose. The filter factor must change according to the distance, and it is realized by changing the factors of the center values and peripheral value according to the distance. Not only a factor setting unit 1306 provided for the diffusion correction filters, but also a ratio setting unit 1309 for the distributors are provided with control values calculated by the CPU 20 on the basis of the tables shown in FIGS. 10 and 16(*a*) and set via a bus 1303.

By use of such a configuration, an effect is produced in that, by forming a plurality of images whose diffusion is corrected according to the distance, the white noise is reduced and an image of high quality can be generated.

Figure 14B:
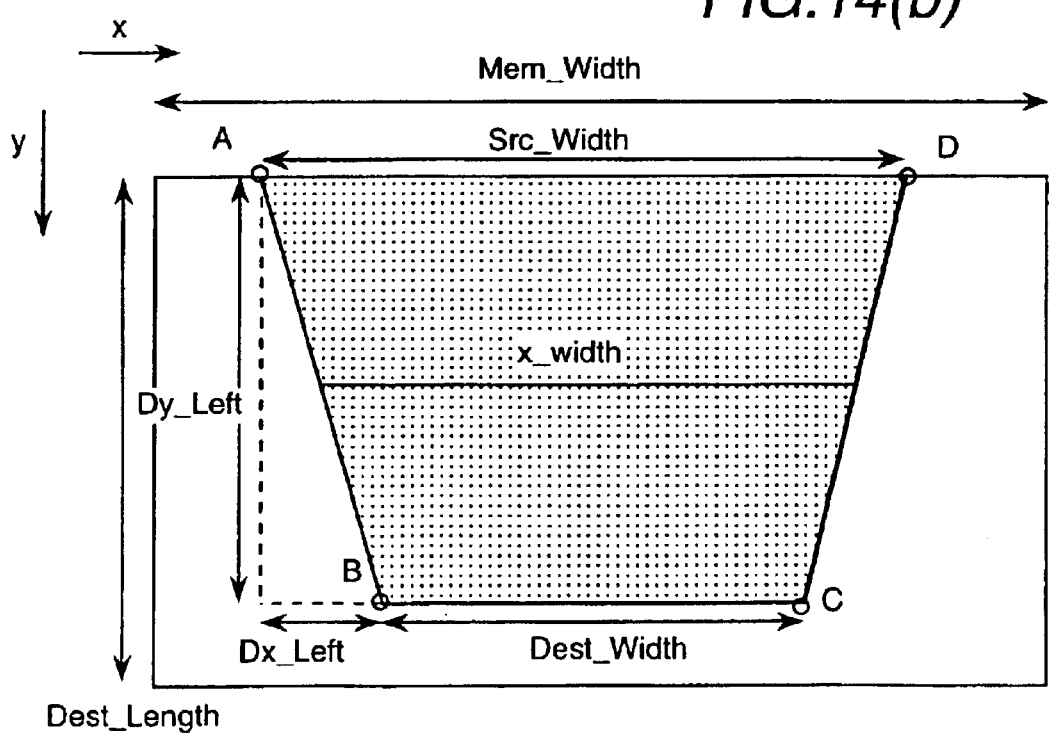
Figure 17:
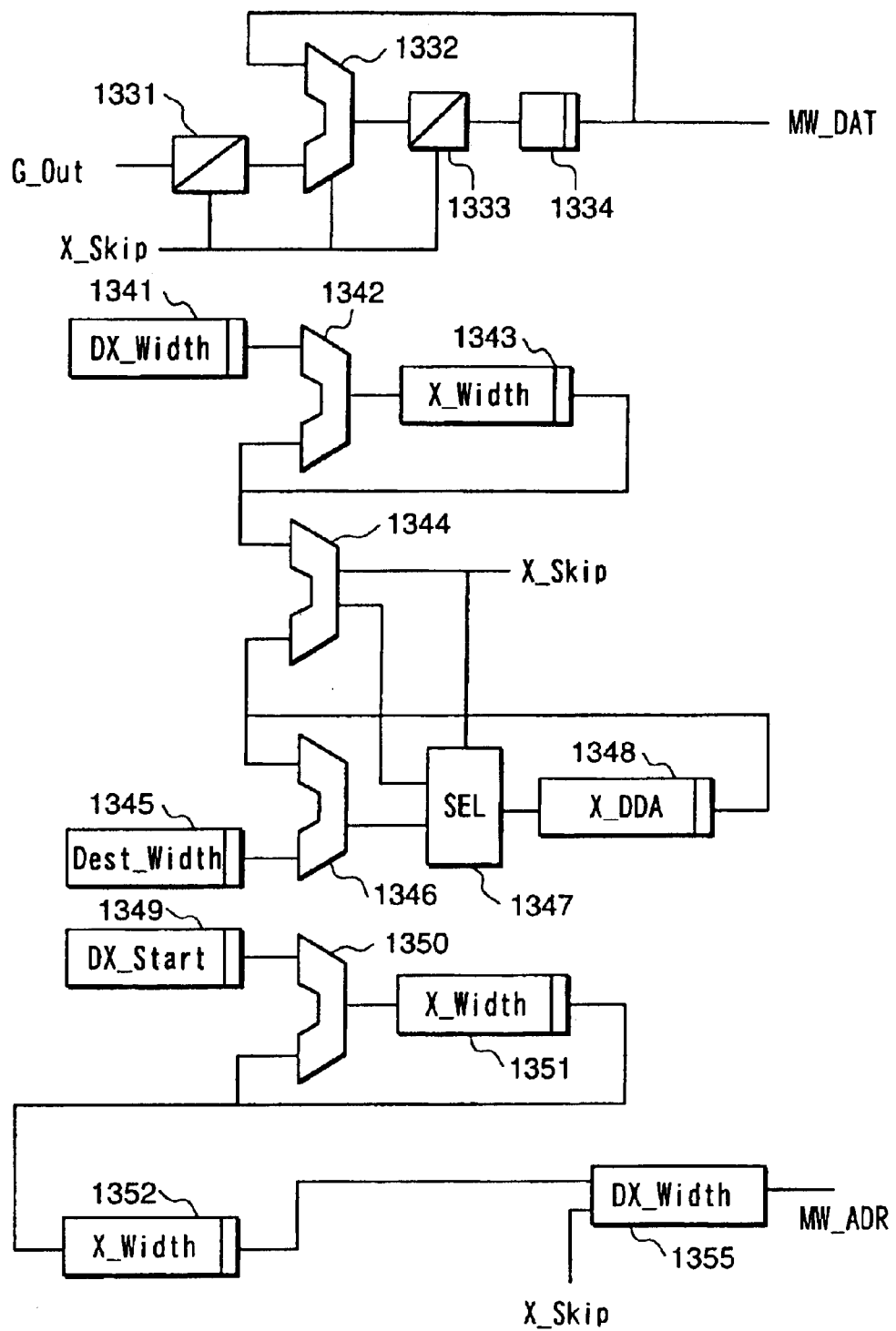
FIG. 17 is a schematic circuit diagram showing the texture mapping unit of the present invention.

FIG. 17 is a schematic diagram of the circuit for executing the operations of the texture mapping unit 15. The output signal G_Out 1312 of the image composition unit generates data by averaging using multilevel data so that no data is lost at the time of reduction of fluoroscopic conversion and obtains the output data MW_DAT. It adjusts the ratio of the input data using a distributor 1331 according to the reduction ratio and composes it by an adder 1332. The output thereof adjusts the ratio using a distributor 1333 in the same way as with the input data and it is stored in a storage unit 1334, the stored value being supplied to the adder 1332. When the variable parameter shown in FIG. 14(b) is set in registers 1341, 1343, 1345, 1351, and 1349 shown in FIG. 17, the hardware executes fluoroscopic conversion. Firstly, the register 1343 stores the length x_Width of the target line which is obtained by subtracting the displacement DX Width stored in the register 1341 periodically from the value stored in register 1343 using a subtracter 1342 in units of one line. On the other hand, using a temporary storage register X_DDA 1348 for DDA for each clock, the value stored in the register 1348 is added to the output length Dest_Width stored in the register 1345 using an adder 1346. However, if X_Width is subtracted from the output of the register X-DDA 1348 by a subtracter 1344 and the register X_DDA 1348 can be subtracted, the subtraction result is set in the register X DDA 1348 via a selector 1347. The borrow of the subtracter 1344 is used as a control signal X_Skip. The reading start address X_Start stored in register 1351 is added to the displacement DX_Start for each line as stored in the register 1349 periodically using an adder 1350 and loads the result in an X direction counter X_Count 1352. The value in this counter is used as a reading address. The write address into the memory controls the address MW_ADR output using another memory counter M_Count 1355. By controlling the count-up control using X-Skip, the output length can be set uniformly.

By use of such a circuit, an effect is produced wherein merely by setting several registers from the CPU, the texture mapping process with a fluoroscopic conversion function can be realized.

Figure 18:
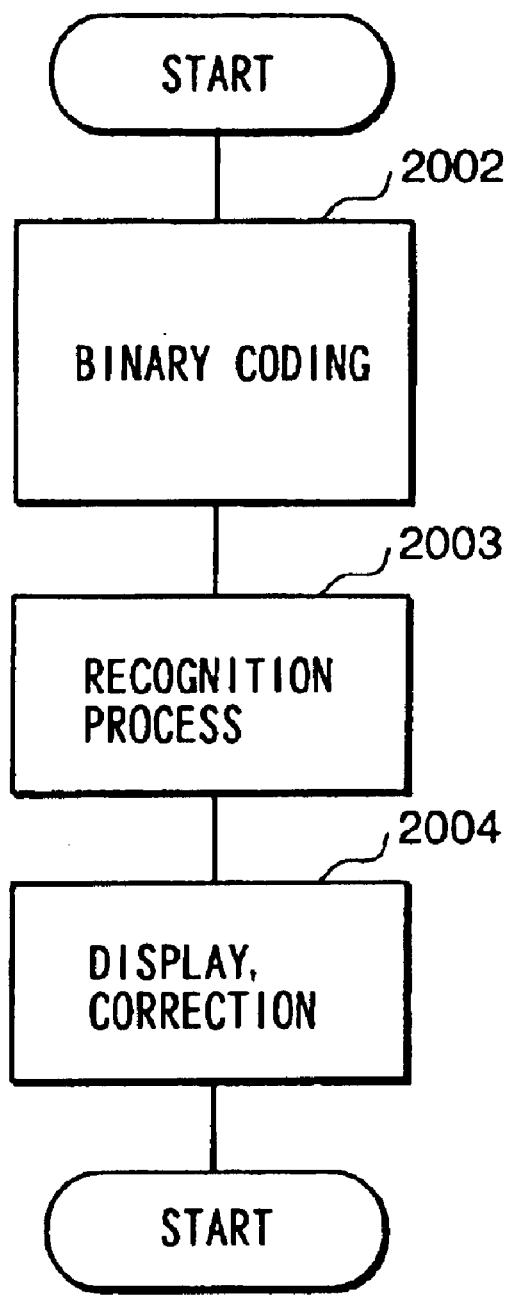
FIG. 18 is a flow diagram used for explaining the processing procedure of a personal computer in accordance with the present invention.

FIG. 18 shows a rough flow of the process of the personal computer 2 receiving data after correction. Firstly, the personal computer 2 binary-codes the received multilevel data (Step 2002), performs the recognition process (Step 2003), and then displays it on the display 3. Furthermore, the personal computer 2 corrects characters which cannot be recognized (Step 2004). By use of such a processing, an effect is produced in that, since the personal computer 2 performs the processes, such as binary-coding and noise removal, the processing of the scanner is reduced and the total system cost can be reduced.

Figure 19A:
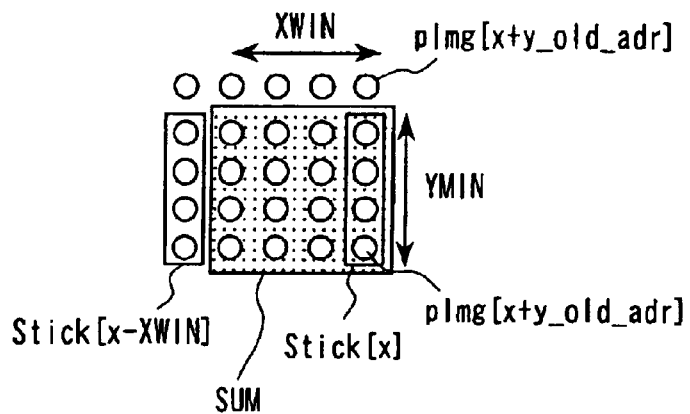
FIG. 19(a) is a diagram and FIG. 19(b) is a flow diagram used for explaining the binary coding process of the personal computer in accordance with the present invention.
Figure 19B:
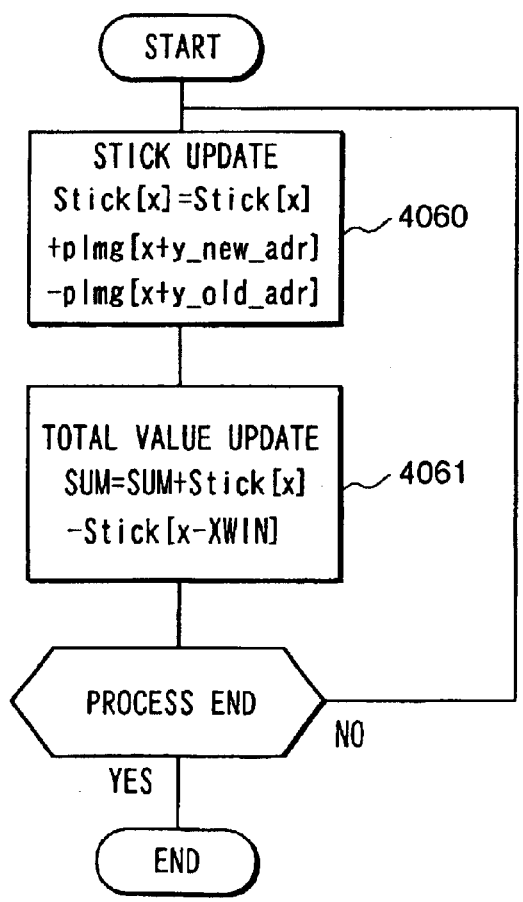

FIGS. 19(a) and 19(b) show an example (FIG. 19(a)) of the binary coding in step 2002 and a detailed flow diagram of the processing (FIG. 19(b)). The binary coding here uses a floating threshold binary-coding system which is hardly affected by the background density and can perform stable binary-coding. The personal computer 2 obtains the total value by the block of main scanning direction XWIN pixels and sub-scanning direction YWIN pixels and calculates the mean value from it. In this case, by using this calculation result, the processing time is shortened. Namely, as shown in FIG. 19(b), the total value SUM can be described as SUM=SUM+Stick[x]−Stick[x−XWIN:4061 using sticks Stick[x] and Stick[x−XWIN] and the stick can be also represented by Stick[x]=Stick[x]+pImg[x+y_old_adr]−pImg[x+y_old_adr]:4060. As a result, without depending on the window size, the total value can be obtained by four memory access operations and four addition and subtraction operations for each window. The total value is multiplied by the factor to create the threshold value and compared with the input value, whereby the binary coding is executed.

By use of such a processing, an effect is produced the that the process of obtaining the mean value by moving the window can be performed in a similar memory access amount to that when an image is divided into a tile shape and binary-coding is performed by obtaining the mean value in the tile.

Next, another embodiment of the present invention will be explained hereunder with reference to the accompanying drawings.

Figure 20:
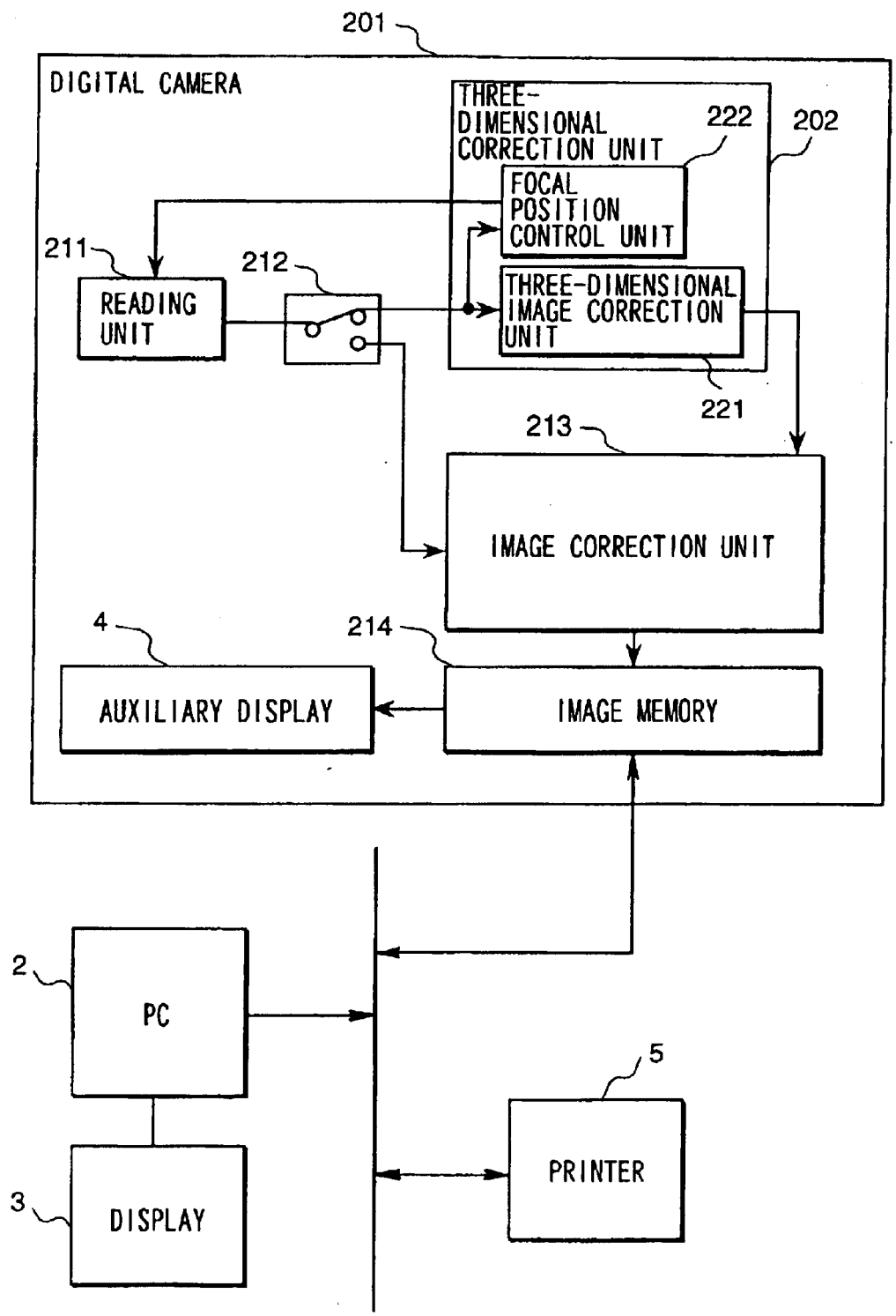
FIG. 20 is a block diagram of a digital camera relating to the present invention.

FIG. 20 is a drawing showing a digital camera related to the present invention and the peripheral system configuration thereof. A digital camera 201 related to the present invention has a reading unit 211, a mode changing switch 212, a three-dimensional correction unit 202, an image correction unit 213, an image memory 214, and an auxiliary display 4. The three-dimensional correction unit 202 is provided with a focal position control unit 222 and a three-dimensional image correction unit 221. To the image memory 214, a personal computer (PC) 2, a display 3 and a printer 5 are connected.

The digital camera 201 reads a document (including figures) disposed on a desk using the reading unit 211, digitizes the read image data, corrects the image data, and then transfers and stores the data in the image memory 214. In this case, the mode changing switch 212 is operated to select whether or not to correct the image data using the three-dimensional correction unit 202.

When the image data is to be corrected by the three-dimensional correction unit 202, the reading unit 211 executes the reading process several times by changing the focus on the basis of a signal produced by the focal position control unit 222 at the time of imaging. In the focal position control unit 222, a plurality of appropriate focal positions obtained from the optical system are preset, and, on the basis of a reading instruction from the user, the reading unit 211 moves the lens and executes a photographing process. For example, when the user instructs photographing, the reading unit 211 performs the reading process such as executing a first reading in a state in which the focus is on the document stand and then executing a second reading in a state in which the focus is on a position three centimeters above the document stand. The three-dimensional correction unit 221 performs the correction process according to the first reading and second reading and outputs image data to the image correction unit 213 after the correction process has been completed.

When of the image data correction by the three-dimensional correction unit 202 is not carried out, the image data read by the reading unit 211 is directly output to the image correction unit 213.

The image correction unit 213 receives the image data from the three-dimensional correction unit 202 or directly from the reading unit 211 and performs an image quality correction, such as a brightness correction, and then stores the image data in the image memory 214. The stored image data also can be displayed on the auxiliary display 4 attached to the camera.

The image data stored in the image memory 214 is transferred to the personal computer 2 and the personal computer 2 executes recognition of characters and figures and processing of images, displays the recognition result and target image on the display 3, and outputs the data to the printer 5 when necessary. The image data can be directly output from the image memory 214 to the printer 5.

Each unit of the digital camera shown in FIG. 20 will be explained in more detail.

Figure 21:
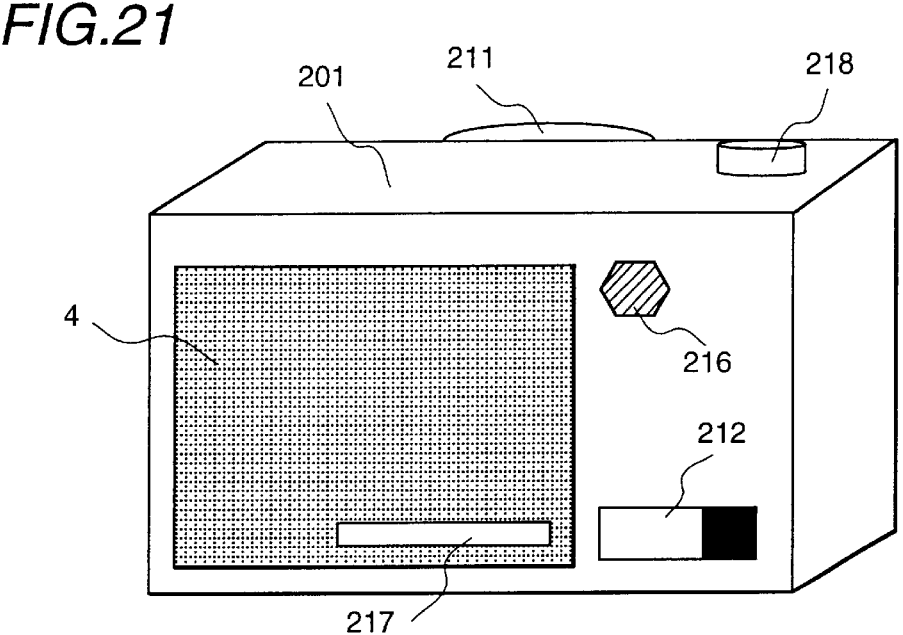
FIG. 21 is a perspective view showing the appearance of the digital camera relating to the present invention.

FIG. 21 shows the outer appearance of a digital camera related to the present invention. The digital camera 201 has a CCD sensor operating as an imaging device, which and reads an image through a lens. The camera body includes a button 218, an auxiliary display 4 for displaying read images and images after correction, a mode selection switch 212 for selecting correction contents at the time of reading, a display unit 217 for displaying the current reading mode, and a mike 216 for indexing the read images by voice. By use of such features, an apparatus having a high degree of freedom and a high operability, which uses a digital camera and reads images can be provided.

By transferring read image data to a personal computer or a printer, for example, by attaching the digital camera to a general-purpose interface, such as a USB, a user can fetch image data in the camera, print it with the printer, and perform the process of recognition of character information in the image. Furthermore, when a data sending device is built in the camera (the data sending device can be of the wireless type) and a receiver is attached on the data receiving side, such as a personal computer, it is not necessary to use a cable to transfer read images, so that images can be read with higher degree of freedom.

Figure 22:
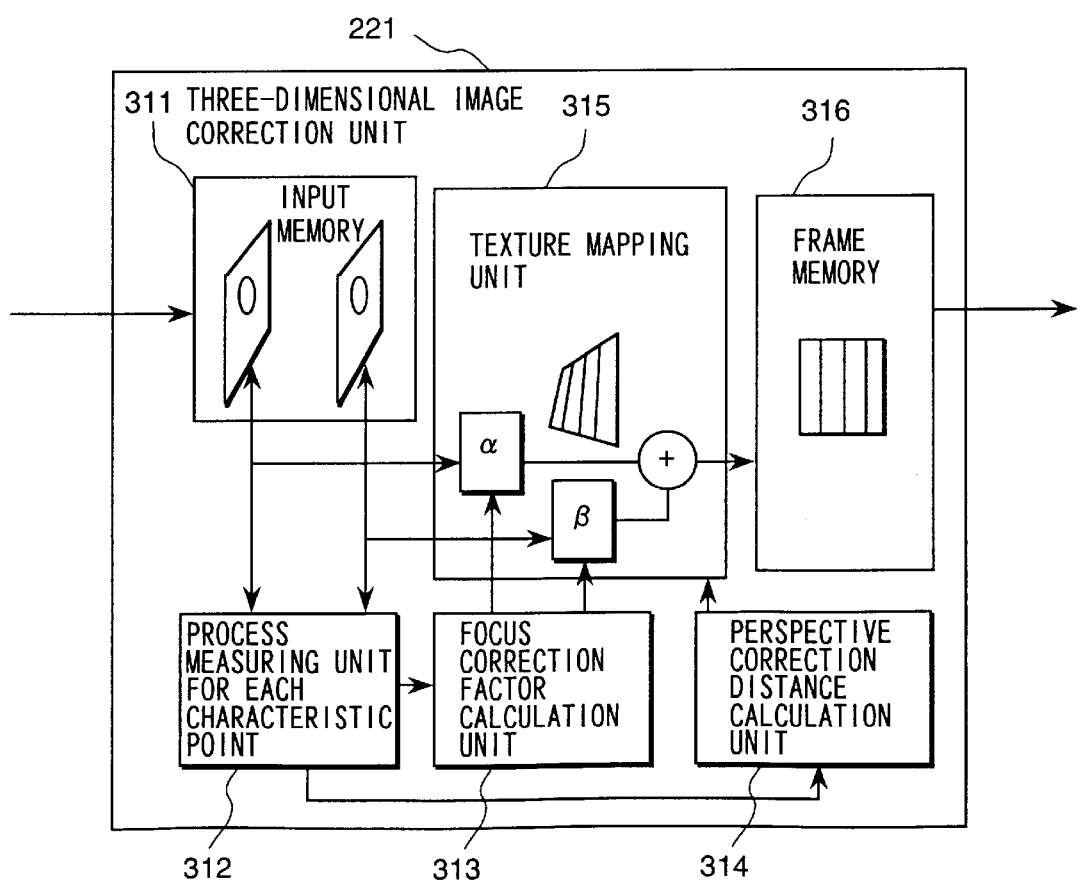
FIG. 22 is a block diagram of a three-dimensional image correction unit.

FIG. 22 shows a block diagram of the three-dimensional image correction unit 221 in the three-dimensional correction unit 202. Using a plurality of images read by the reading unit 211 under control of the focal position control unit 222, the distance measuring unit 312 calculates the deviation between images for each characteristic point and extracts characteristic points. In this case, a part whose image differs depending on the reading condition is called a characteristic point. Namely, when the focus value of the camera is changed and a piece of paper on the desk is read, the image of the paper at the edge diffused and changed. Such a point is called a characteristic point. According to the difference in the image of the characteristic point, the distance between the camera and the characteristic point is measured. Next, the focus correction factor calculation unit 313 measures the diffusion condition according to the focal position beforehand using the aforementioned distance, prepares a filter for controlling the diffusion depending on the measurement result, and corrects the diffusion. Furthermore, the focus correction factor calculation unit 313 selects the image nearest to the focal length from images picked up at a plurality of focuses according to the distance between the lens measured at each characteristic point and the characteristic point, and composes images. Next, the perspective correction distance calculation unit 314 obtains the geometric deformation condition of a document, which is originally flat, due to a geometric change during reading, tilt, document thickness, and folding of the document, by calculating the isolation amount of the document stand from the measurement result of the distance between the characteristic point and the lens, transfers the shape data to the texture mapping unit 315, corrects the deformation so as to return the deformed shape to a plane, and stores the corrected image in the frame memory 316. Thereafter, the image data is transferred to the image correction unit 213.

By use of such a correction unit, an effect is produced whereby an apparatus low in cost, which requires no special distance measuring sensor, can be provided. Since the distance can be measured for each characteristic point, for a parameter which changes depending on the distance, such as a diffusion correction parameter, a most suitable correction pattern can be set at each characteristic point, and, hence, an effect is produced in that, when reading a form which is complicatedly folded or the surface of a three-dimensional body, a most suitable pattern can be set in the whole image. Since images are composed using images read at a plurality of focuses, an effect is produced whereby images having little noise and diffusion of characters and symbols described in a document can be obtained. Furthermore, since both geometrical correction and distance correction are executed, images of characters and symbols, as described in a document, can be provided with little distortion.

Figure 23:
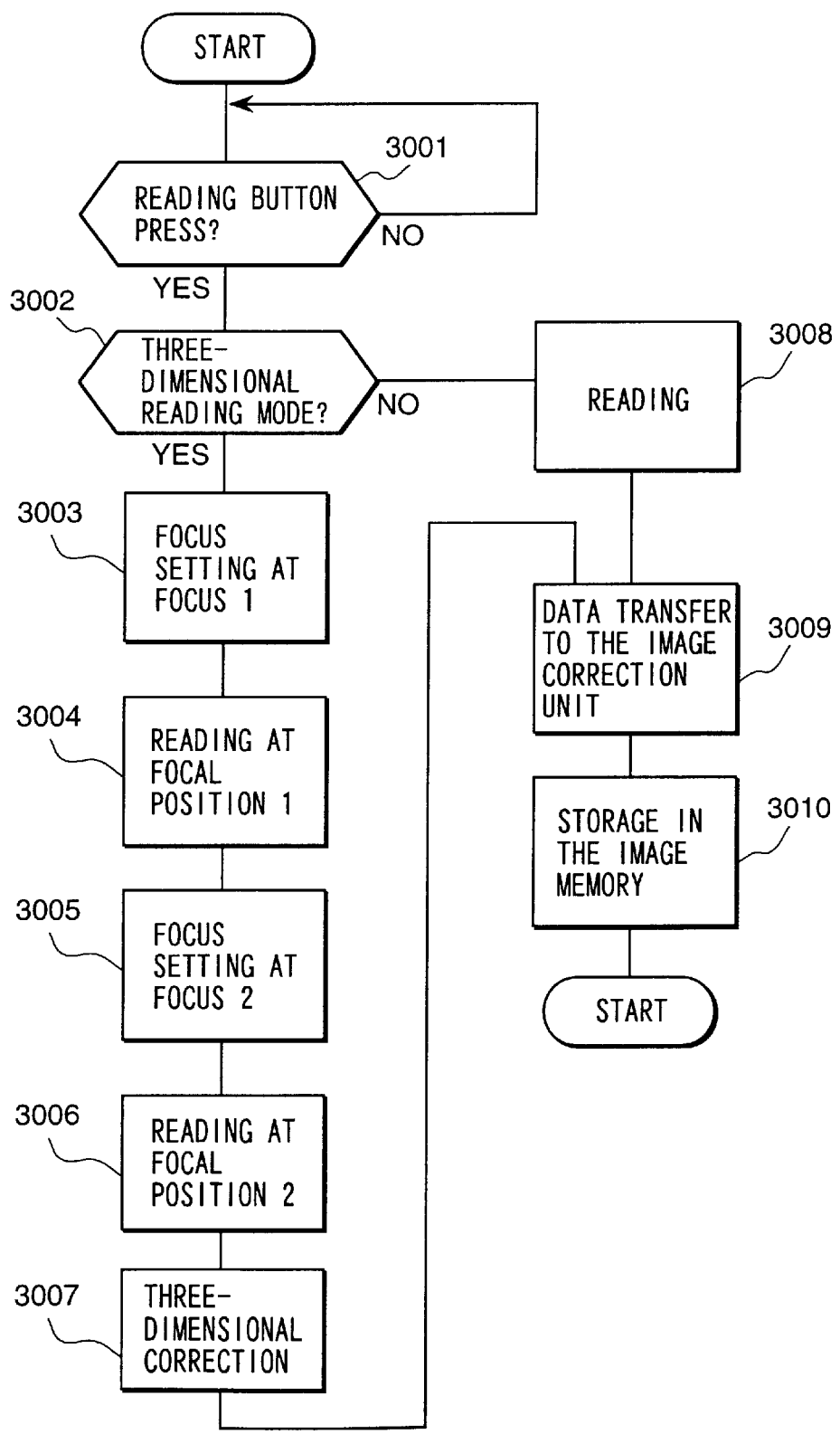
FIG. 23 is a flow diagram showing the flow of the reading operation.

FIG. 23 shows a flow of the reading operation. When the reading button is pressed (Step 3001), the condition of the mode selection switch 212 is retrieved (Step 3002); and, when the three-dimensional reading mode is selected, the focal position control unit 222 sends a control signal to the reading unit 211, and the focal position of the lens is set to the focal position 1 (Step 3003). When the setting of the focal position is completed, the reading operation is performed (Step 3004). Then, an image is input with the document surface focused. When the reading operation is completed, the focal position control unit 222 sends a control signal to the reading unit 211 in the same way, and the focal position of the lens is set to the focal position 2 (Step 3005). When the setting of the focal position is completed, the reading operation is performed again (Step 3006). For the set values of the focal position 1 and focal position 2, the value of a focal position which is adjusted beforehand so as to read a document having a certain thickness is used. Furthermore when necessary, the reading condition of the focal position is changed and images are input beforehand. The three-dimensional correction is executed from these images (3007), and data is transferred to the image correction unit (3009).

If the three-dimensional reading mode is not selected at Step 3002, the reading operation is performed only once and data is transferred to the image correction unit (Step 3009). The image correction unit, when an image is displayed darkly, corrects the brightness and finally stores it in the image memory 214 (Step 3010). By use of such a procedure, an effect is produced wherein a plurality of images are picked up by pressing the reading button 218 of the camera only once, and the image data can be corrected and stored immediately after imaging, whereby the operability is improved.

Figure 24:
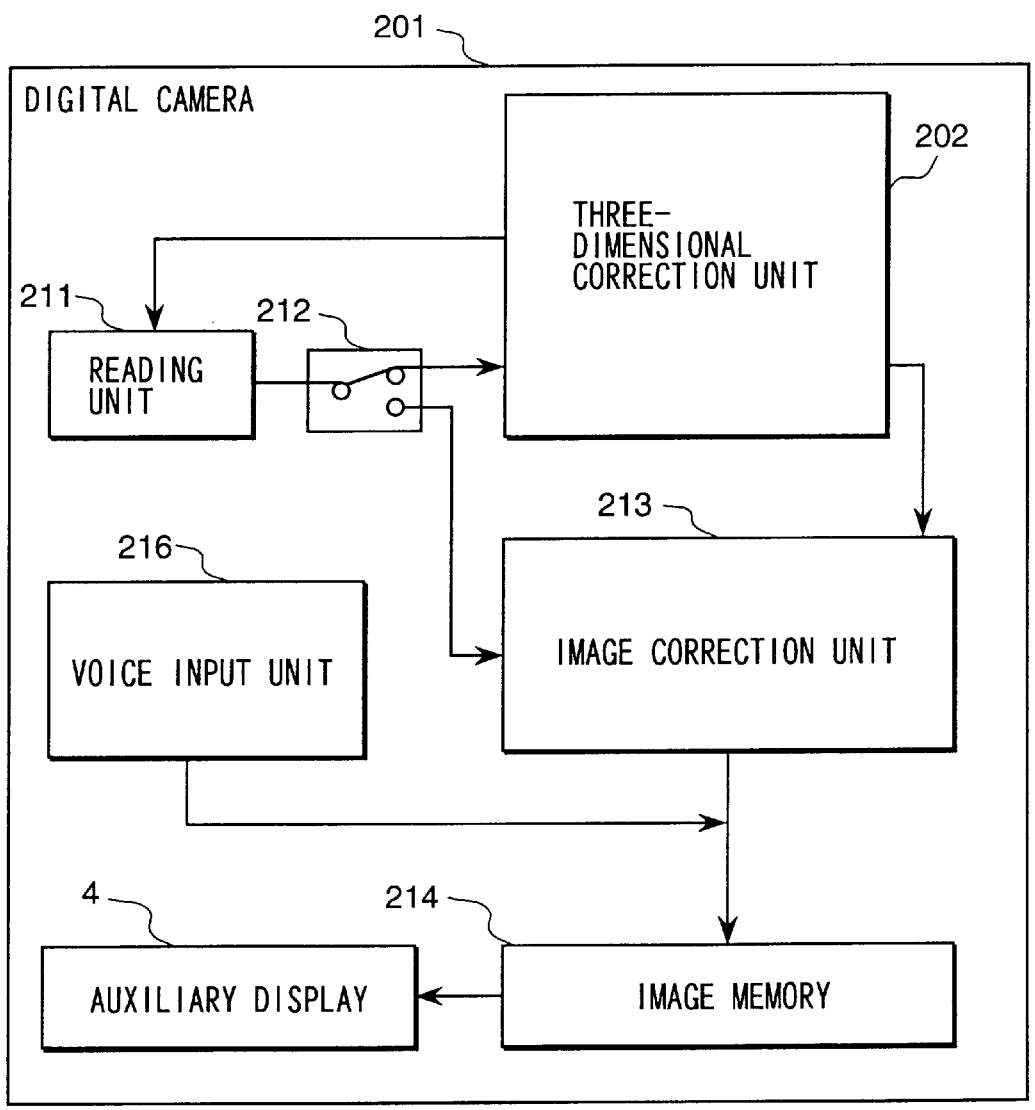
FIG. 24 is a block diagram of a digital camera with the image index function added.

FIG. 24 is a block diagram of a digital camera having an image indexing function. The digital camera 201 is provided with a voice input unit (mike) 216 for adding a memo to an image after picking up and storing image data.

A user, during or after picking up images, inputs records for explanation of the picked-up images, a memo, and a title by voice via the mike 216. Images read from the reading unit 211 are corrected by the three-dimensional correction unit 202 or data is directly transferred to the image correction unit 213, and then the input record is added to the image data, and the image data is stored in the image memory 214. As a data format, voice data is added to the end or top portion of the image memory and recorded; and, when reading it, it can be reproduced by separating the respective voice and image data. By this function, data can be easily controlled after images are picked up, so that an effect is produced whereby an effective acquisition operation of image data can be performed.

Figure 25:
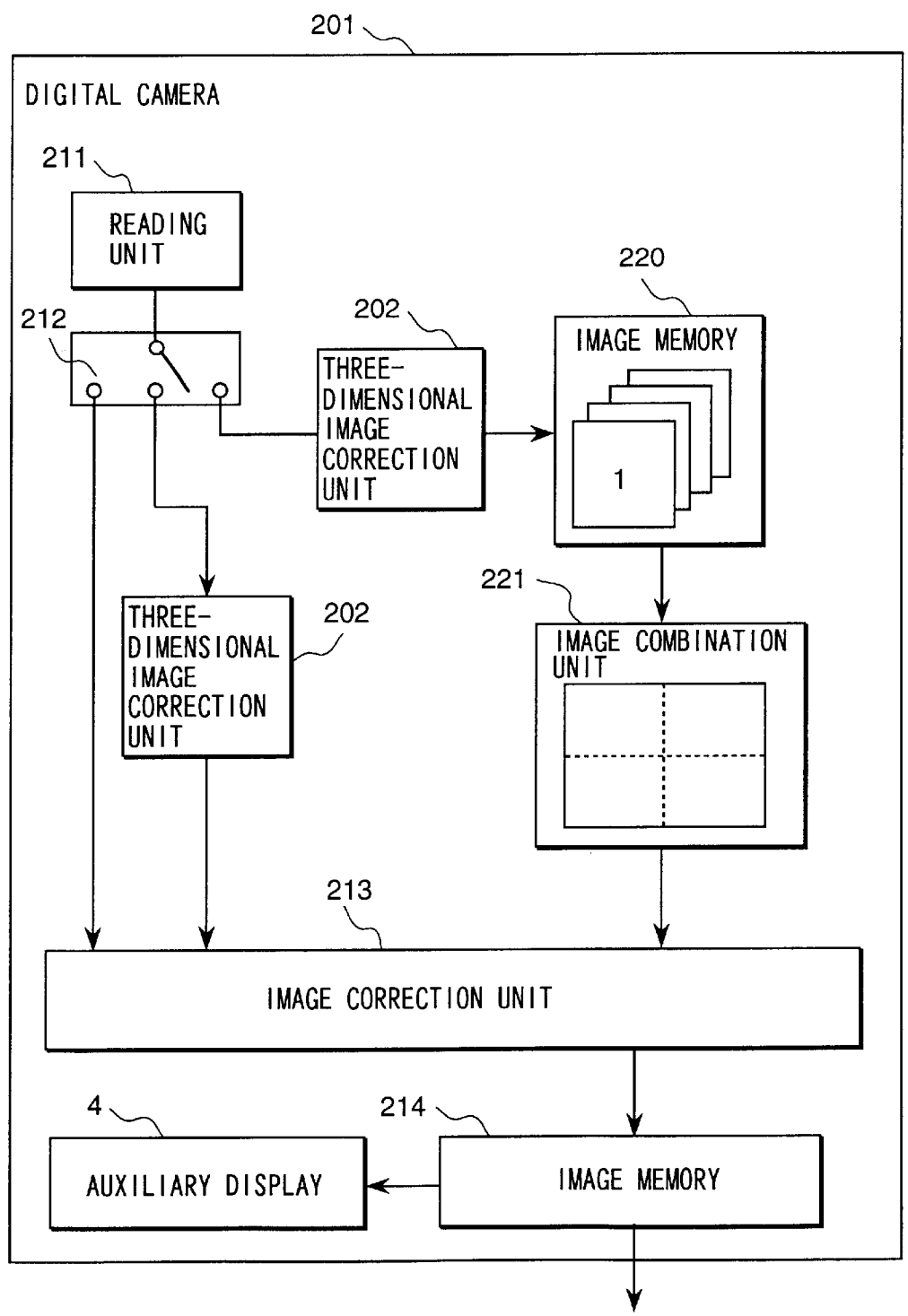
FIG. 25 is a block diagram of a digital camera with the division reading function added.

FIG. 25 is a block diagram of a digital camera for fetching an image of a huge plane surface. When the division reading mode is selected by the mode changing switch 212, an image read by the reading unit 211 is subjected to the aforementioned three-dimensional image correction and stored in the image memory 220. In this case, for picking up images, when a user specifies a number of divided images beforehand, a plane is divided into quadrilaterals according to a fixed rule and indexed, and the result is displayed on the auxiliary display 4. Before starting imaging, the user declares which area is to be imaged using the mike 216 and then starts imaging.

When images of a number of divided images which has been specified first are stored in the image memory 220, the image data is transferred to the image combination unit 221. The image combination unit 221 combines adjacent images and outputs them to the image correction unit 213 as one image. The image combination methods are realized in the general software and the image combination can be realized using these methods.

By use of such a digital camera, an effect is produced whereby the image combination can be realized merely by incorporating a memory and image combination software into the digital camera of the present invention.

Figure 26:
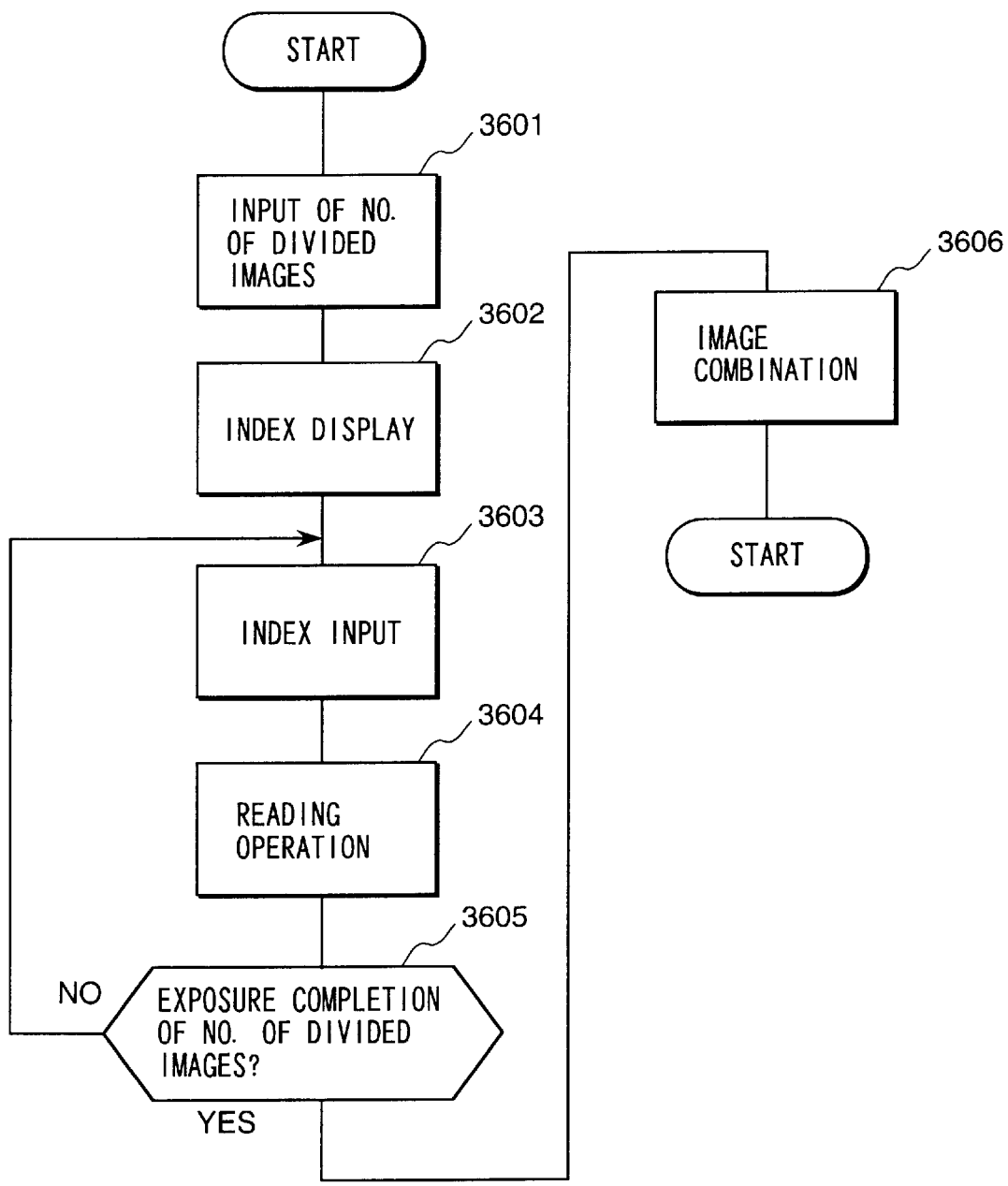
FIG. 26 is a flow diagram showing the processing flow in the division reading mode.

FIG. 26 shows a flow of the division reading function. When a user first inputs the desired number of divided images (Step 3601), indexes are automatically prepared in the camera according to a fixed rule and the result of division is displayed on the display (Step 3602). Next, the user inputs a displayed index number (Step 3603) and picks up the image at the corresponding position (Step 3604). This operation is repeated according to the number of divided images (Step 3605). When all of the divided images have been picked up, the image data is composed by the image combination unit (Step 3606) and the data is stored in the image memory.

When picking up an image of figures and characters drawn on a huge plane, such as a large wall painting, by this function, the limitation of the imaging location can be substantially reduced. Therefore, an effect is produced in which a reading operation having a high degree of freedom can be performed.

Figure 27:
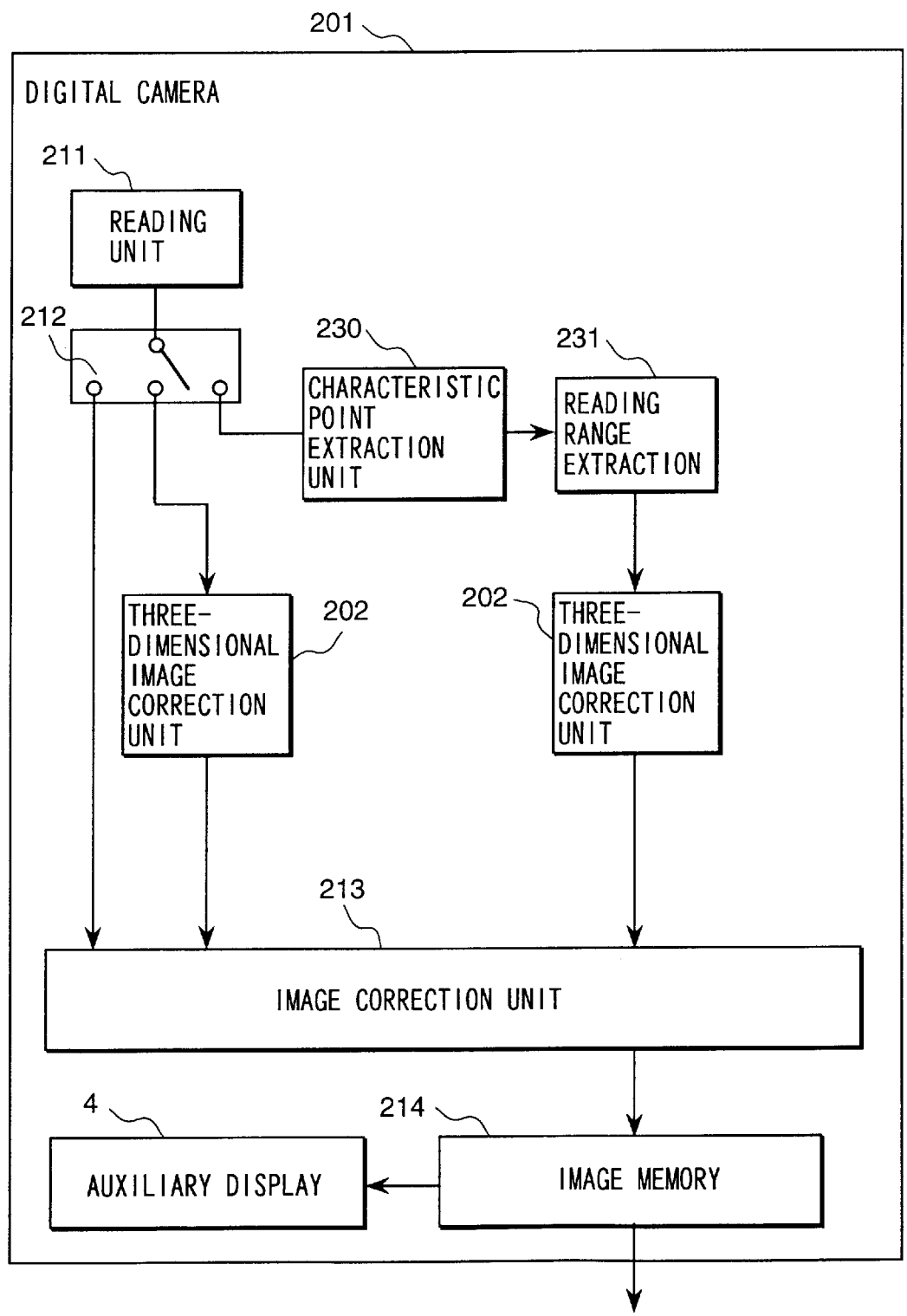
FIG. 27 is a block diagram of a digital camera having a function for automatically setting the reading range using extraction of characteristic points.

FIG. 27 is a block diagram of a digital camera having a function for automatically setting the reading range using characteristic point extraction. When the automatic setting process is selected by the mode selection switch 212, the characteristic point extraction unit 230 extracts characteristic points using distance measurement for each characteristic point for the read image and stores the characteristic point information. When extracting characteristic points, by use of the edge detection process which is generally used in image processing, the same result can be obtained. From this characteristic point information, the rectangular part of an image is extracted as a reading range and the three-dimensional image correction is performed only for the images within this range and is output as a reading result. By doing this, when reading only the pages of a book, the labor of imaging by fitting the reading range to the pages by a user during imaging can be avoided, so that an effect is produced wherein images can be read in a good operability state.

An example of when a book extending over a plurality of pages is sequentially and continuously read will be described. A continuous reading mode and page storage unit are added to the camera via the mode changing switch 212. In this mode, when continuous pages are to be sequentially read, information indicating that the page numbers are recorded in the center on the upper part or the lower part in the image is stored, and at the time of reading, the number at the designated position is recognized using an OCR, and the number of each page being imaged is monitored. Thus, when a number is skipped, a warning can be issued.

Figure 28:
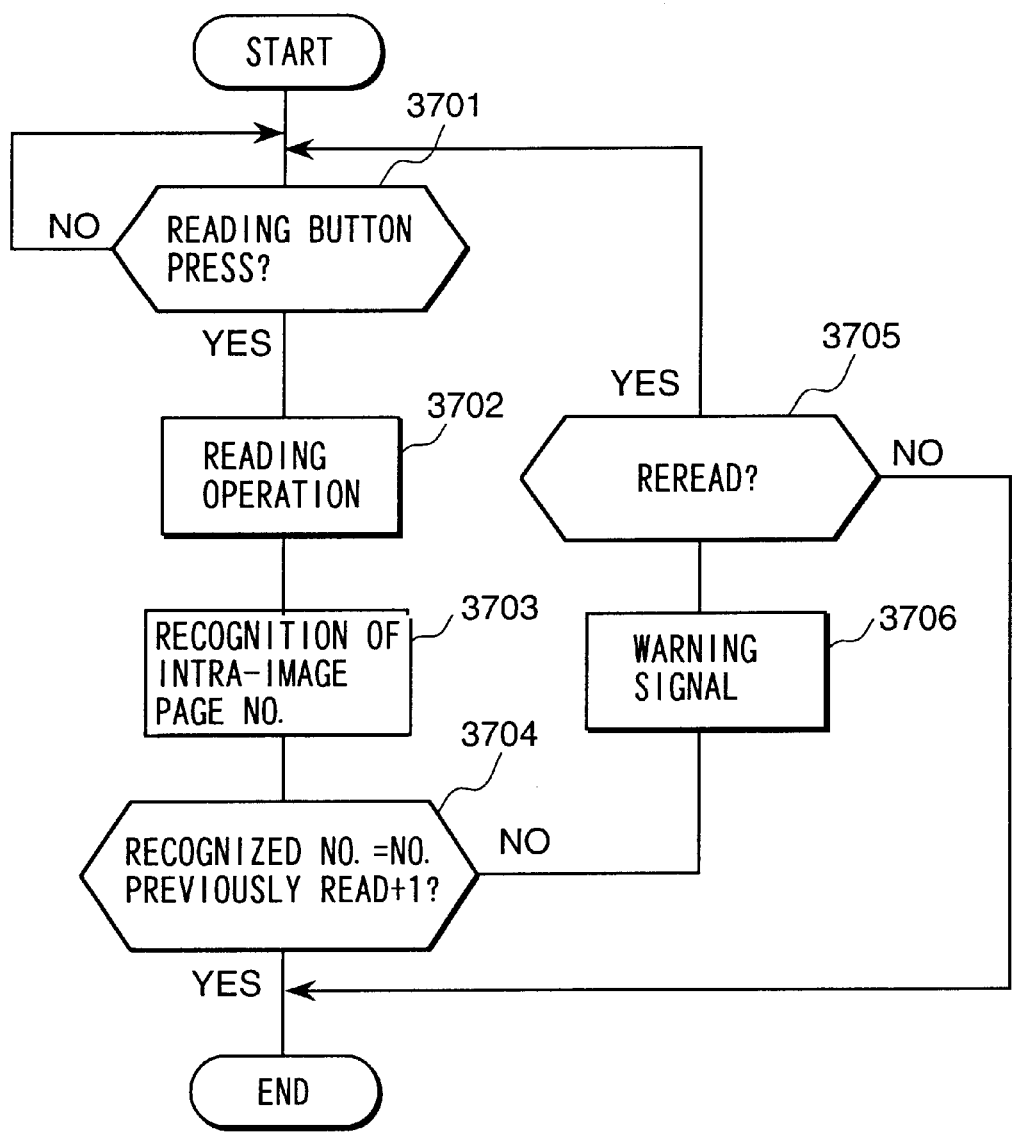
FIG. 28 is a flow diagram showing the processing flow of continuous reading by recognition of page numbers.

The operation flow is shown in FIG. 28. When the reading button is pressed (Step 3701), a reading operation is performed (Step 3702), and a recognition of the page number in the image is performed (Step 3703). Whether the number is the next page to the number read immediately before or not is judged (Step 3704); and, when it is not the next page, a warning is issued to a user using a buzzer or the auxiliary display (Step 3706), and he is requested to select whether or not to reread the previous page (Step 3705). By doing this, an effect is produced that the number of occurrences of skipping during sequential reading of images is reduced and the user can perform the reading operation accurately.

In the aforementioned process, the distance of each characteristic point is measured and corrected on the basis of image data read under a plurality of conditions. However, when it is decided beforehand that the plane shape is a book of A4 length size or B5 book size, a memory for storing the shape of the frame of characteristic points is provided, and when the reading operation is to be performed using the information, it can be done using the image process alone, without using the characteristic point distance measuring means. The method can be realized by fitting the characteristic point of an image to the specified shape size and combining the process of magnification or reduction of the image according to the ratio of the sizes.

When this method is to be used and when a fixed form of document is to be always read, an effect is produced in which there is no need to provide a distance measuring means, the load of the process is reduced, and the reading operation is speeded up, whereby a user can read images quickly.

The digital cameras shown in FIGS. 20, 24, 25, and 27 may be provided with a radio data communication means for transferring image data to the outside.

Figure 29:
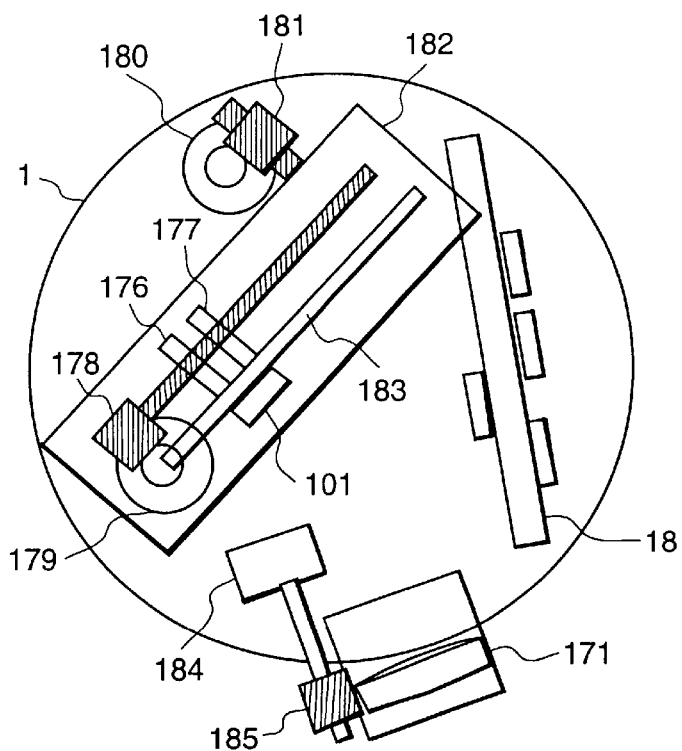
FIG. 29 is a top plan view showing an embodiment of the optical system of a scanner of the present invention.

Next, FIG. 29 shows an embodiment of the detailed configuration of the optical system of the scanner 1. The linear sensor 101 is connected to a pinion 178 via bridges 176 and 177 and is mounted so as to move on a rail 183. The pinion 178 is driven by a pulse motor 179, and by rotating the motor forward or backward, the sensor can be moved. A lens 171 can be moved back and forth by rotating a gear 185 using a pulse motor 184, whereby the focus is adjusted. A support 182 of the linear sensor 101 mounted so that the swing angle can be changed by a pulse motor 180 and a gear 181. Three pulse motors are used here. However, they need not move at the same time, so that it is possible to use one motor having a clutch in place of the three motors. The hardware of the processing unit is mounted on a control board 18, which is housed in the same unit.

When the scanner 1 is structured as mentioned above, the swing angle and focal length can be freely controlled, so that an effect is produced in which the scanner unit can read from a free position unless the reading distance is fixed, like stand type scanner. In this example, the scanner 1 is used for moving the linear sensor 101 in the sub-scanning direction. However, the present invention can be applied to a scanner for scanning by a mirror with the linear sensor 101 fixed thereto.

Figure 30A:
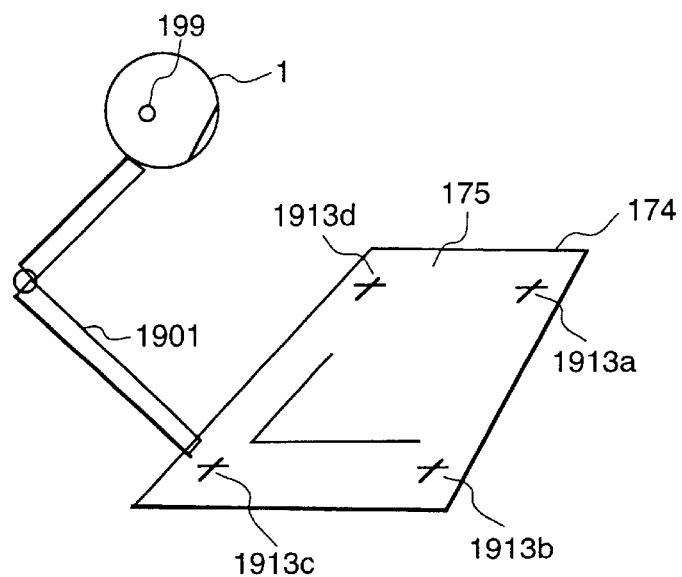
FIGS. 30(a) and 30(b) are diagram showing another embodiment of the non-contact image reader of the present invention.
Figure 30B:
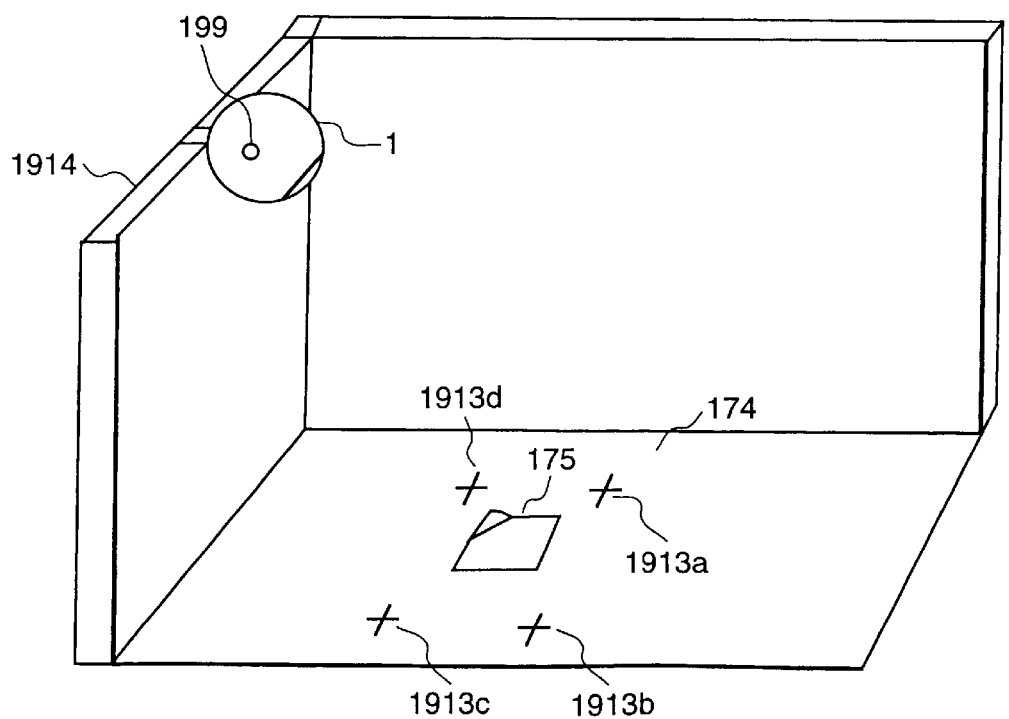

FIGS. 30(a) and 30(b) show another embodiment of the present invention. In FIG. 30(a), a moving support 1901 for the scanner 1 has a structure that allows it to move freely like an arm, and so the scanner I can read a document 175 from all angles. By operating the image reading button 199 provided on the scanner 1, the swing angle and focal position are automatically adjusted using reference coordinate markers 1913*a* to 1913*d* formed on the document stand 174.

The reference coordinate markers 1913*a* to 1913*d* are input as images, and the personal computer 2 calculates the reference position. The personal computer 2 controls a changing of the focal position and swing angle of the scanner 1 so as to correctly read this position, and the images are input once again, and the process is repeated. By doing this, regardless of the reading position, correctly focused images can be input. FIG. 30(*b*) shows an arrangement wherein the scanner 1 is fixed to a partition 1914 with a clip. By use of such a construction, an effect is produced in which the space on the desk can be more effectively used.

Figure 31:
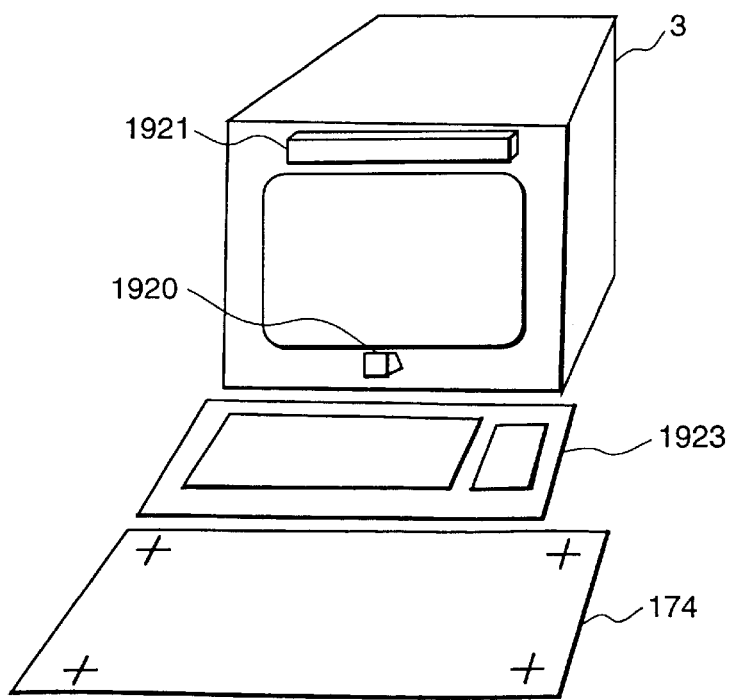
FIG. 31 is a perspective view showing still another embodiment of the non-contact image reader of the present invention.

FIG. 31 shows an embodiment in which the scanner 1 of the present invention is integrated with the display 3. A sensor and a sensor frame 1920 are attached to the lower part of the display, and a rotary mirror 1921 is attached to the upper part of the display. With this arrangement, an image on the document stand 174 is reflected from the rotary mirror 1921 and read by the sensor 1920. In this case, using an input device, such as a keyboard 1923, the document is read. In this way, the embodiment takes no additional room, like a conventional flat bed scanner, and images can be input simply at high speed.

Figure 32:
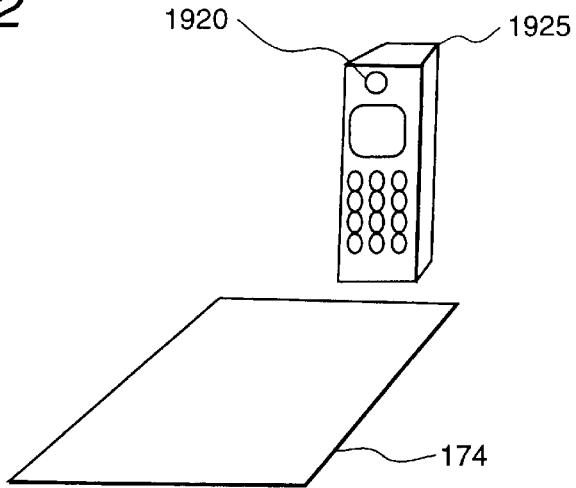
FIG. 32 is a perspective view showing a further embodiment of the non-contact image reader of the present invention.

FIG. 32 shows an embodiment in which the scanner of the present invention is applied to a portable terminal 1925, such as a pocket telephone, PHS, or PDA. The sensor 1920 is provided on the upper part of the portable terminal 1925, and the sensor 1920 reads a document placed on the document stand 174. Even when it is read obliquely, the distortion can be corrected, so that it is not necessary to set the camera above the document like a conventional digital camera and images can be easily input when the image reader of the present invention is applied to a miniature portable terminal, such as a pocket telephone, a document can be easily read, regardless of the environment.

Furthermore, when the portable terminal is provided with a communication function for communicating with the outside, a read image can be simply sent to another portable terminal at high speed.

Next, another embodiment of the present invention will be explained with reference to the accompanying drawings.

Pig. 33 shows a block diagram of a document information correction device which represents another embodiment of the present invention. The document information correction device of the present invention reads a document placed on a desk, such as a distribution article 530, using a non-contact reading unit 510, corrects an image, then analyzes the read image using an image analyzer unit 514, and classifies it into parts, such as ID code or classification bar code, destination address, and name. The classification bar code is recognized as a code by an ID detection unit 511, and the destination address code is recognized. Using the ID, an address data base 513 is referred to and information corresponding to the ID code is read out. On the other hand, the address and name of the read image are recognized by a character recognition unit 515, and the recognition result of the read image and the information read from the data base are checked by an information correction unit 516, and whether the address is changed or the destination is not clear is decided. When the data read from the data base includes data indicating a change of address, making it necessary to send the distribution article to a new address, the information correction unit 516 additionally records the new address according to the ID code. The added image is displayed on a display 522 via a display unit 519 and an operator outputs and instructs correction and confirmation of the additional recording position by keys and a mouse 520. When there is no space for additional recording on the distribution article 530, the operator instructs output of a label. An output unit 518, depending on the aforementioned label output or additional recording print output, selects use of a label output printer 512*a* or use of an additional recording printer. A label 523 output from the label output printer 521*a* is attached to the distribution article by the operator. Since the label is output to the distribution article 530 which is seen face up, the label cannot be attached by mistake. In the case of use of an additional recording printer, when the distribution article 530 passes through an additional recording printer 521*b*, the new address is additionally recorded in the specified position.

Figure 34:
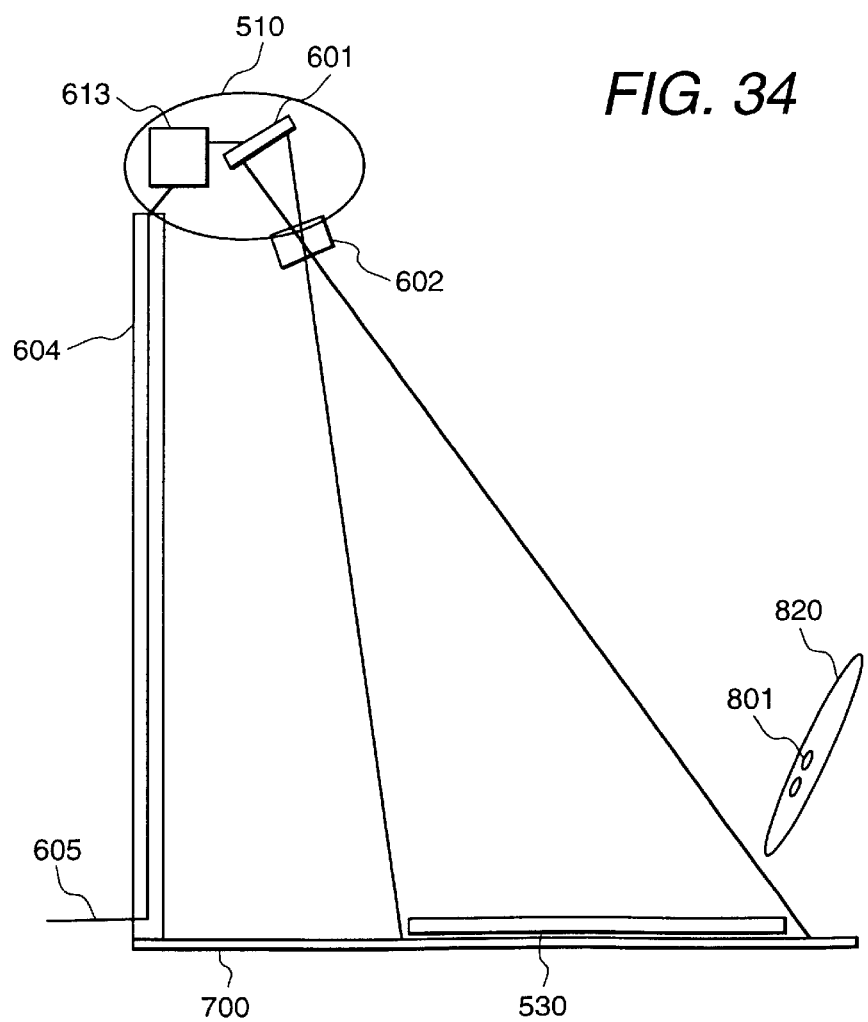
FIG. 34 is a side view showing a non-contact reading unit.
Figure 33:
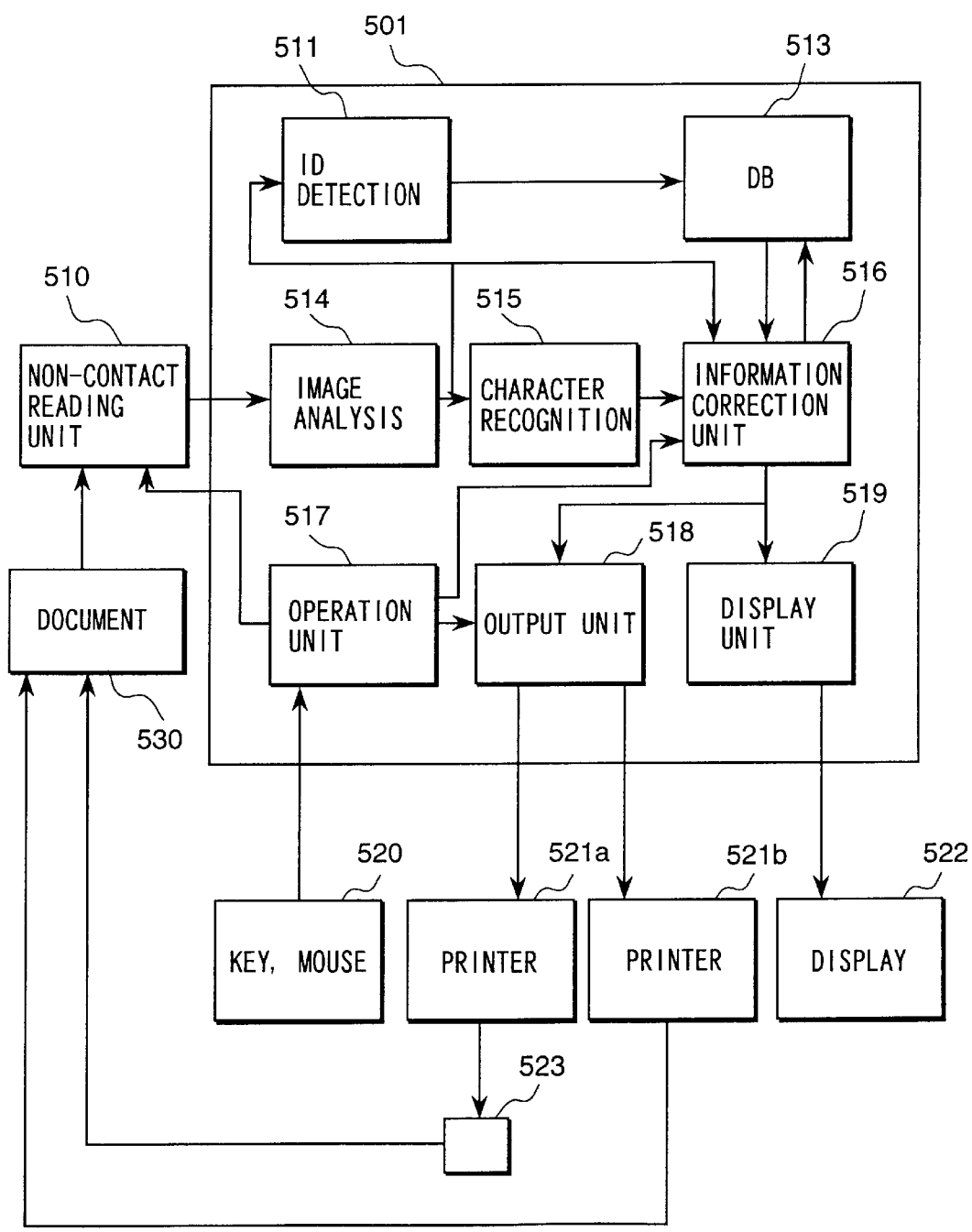
FIG. 33 is a block diagram of a document information correction device of the present invention.

FIG. 34 shows the non-contact reading unit 510 in detail. The non-contact reading unit 510 is fixed at a height of about 50 cm above the desk by a stand 604 and reads the distribution article 530 on the desk 700 in a non-contact manner. Namely, an optical image is formed on an air sensor 601 via a lens 602 and is subjected to photoelectric conversion by the air sensor 601. This converted electric signal is converted to a digital signal by an A-D converter 603 and is connected to the body 501 via a cable 605. The reading start of the non-contact reading unit 510 is instructed by a switch 801 mounted on a pointer 820. In this way, there is no need to especially input a command from the keyboard and click the screen using a mouse, and so the equipment can be operated more effectively.

Figure 35:
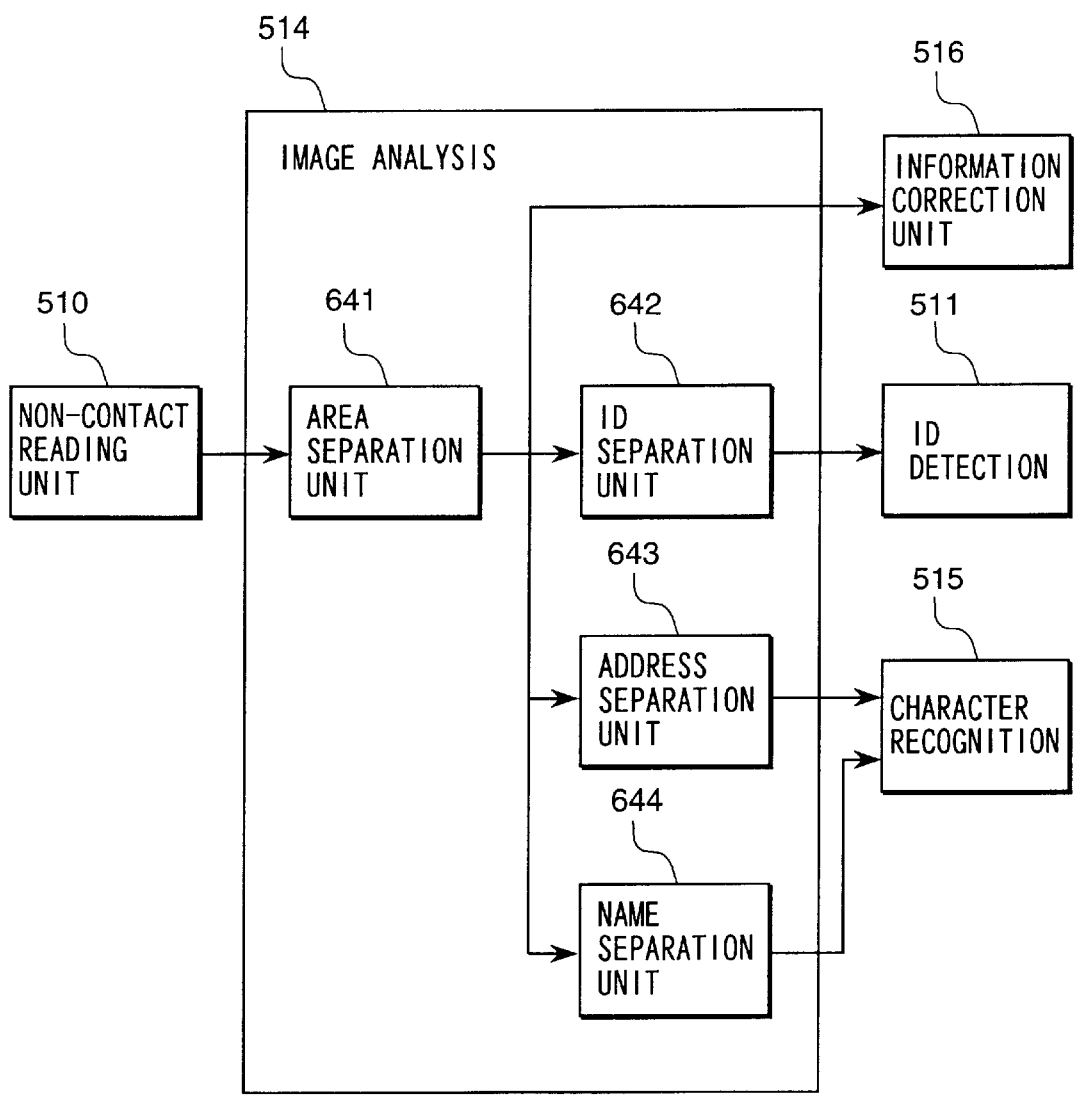
FIG. 35 is a block diagram of an image analytical unit.

FIG. 35 shows a block diagram of the image analysis unit 514. Using the digital signal from the non-contact reading unit 510, an area separation unit 641 separates character areas and executes image separation, such as an input bar code, a zip code, a destination address, and a name. This process can be realized by the general process used in a mail destination reader.

The area separation unit 641 outputs information to the information correction unit 516 for margin detection, to an ID separation unit 642 for bar code recognition, to an address separation unit 643 for recognition of a zip code and an address, and to a name separation unit 644 for name recognition. The ID separation unit 642 performs a tilt correction for the ID detection unit 511 and a preprocess, such as binary coding. The address separation unit 643 and the name separation unit 644 separate data in character units and process images so that they can be recognized by the character recognition unit 515.

Figure 36A:
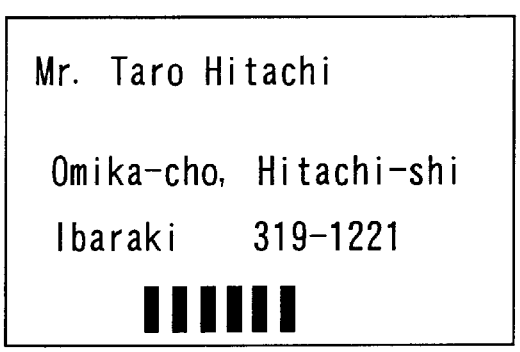
Figure 36A:
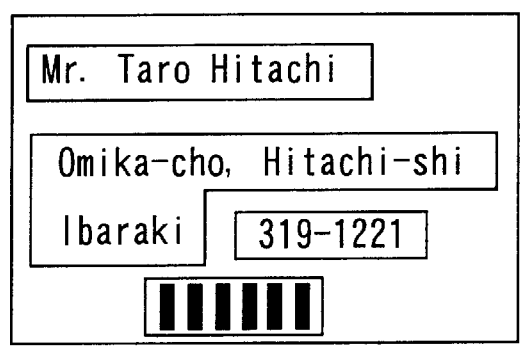
Figure 36A:
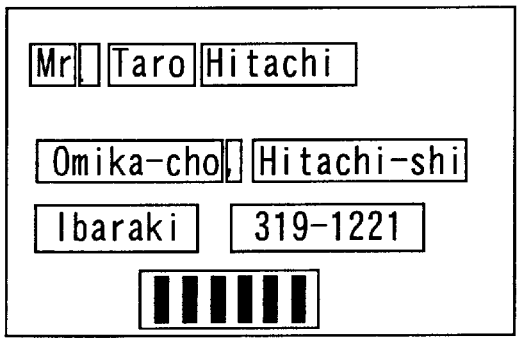

FIGS. 36(*a*) to 36(*d*) are diagrams for explaining the function of the image analysis unit 514. FIG. 36(*a*) shows an example of a distribution article. On the distribution article 530, a zip code 531, an address 532, a name 533, and a bar code 534 are printed. The area separation unit 641, as shown in FIG. 36(*b*), divides the items into a zip code area 531*k*, an address area 532*k*, a name area 533*k*, and a bar code area 534*k*. Furthermore, with respect to the zip code area 531*k*, the address area 532*k*, and the name area 533*k*, as shown in FIG. 36(*c*), the area separation unit 641 divides them in units of characters, executes character recognition, and obtains the recognition result as shown in FIG. 36(*d*).

Figure 37:
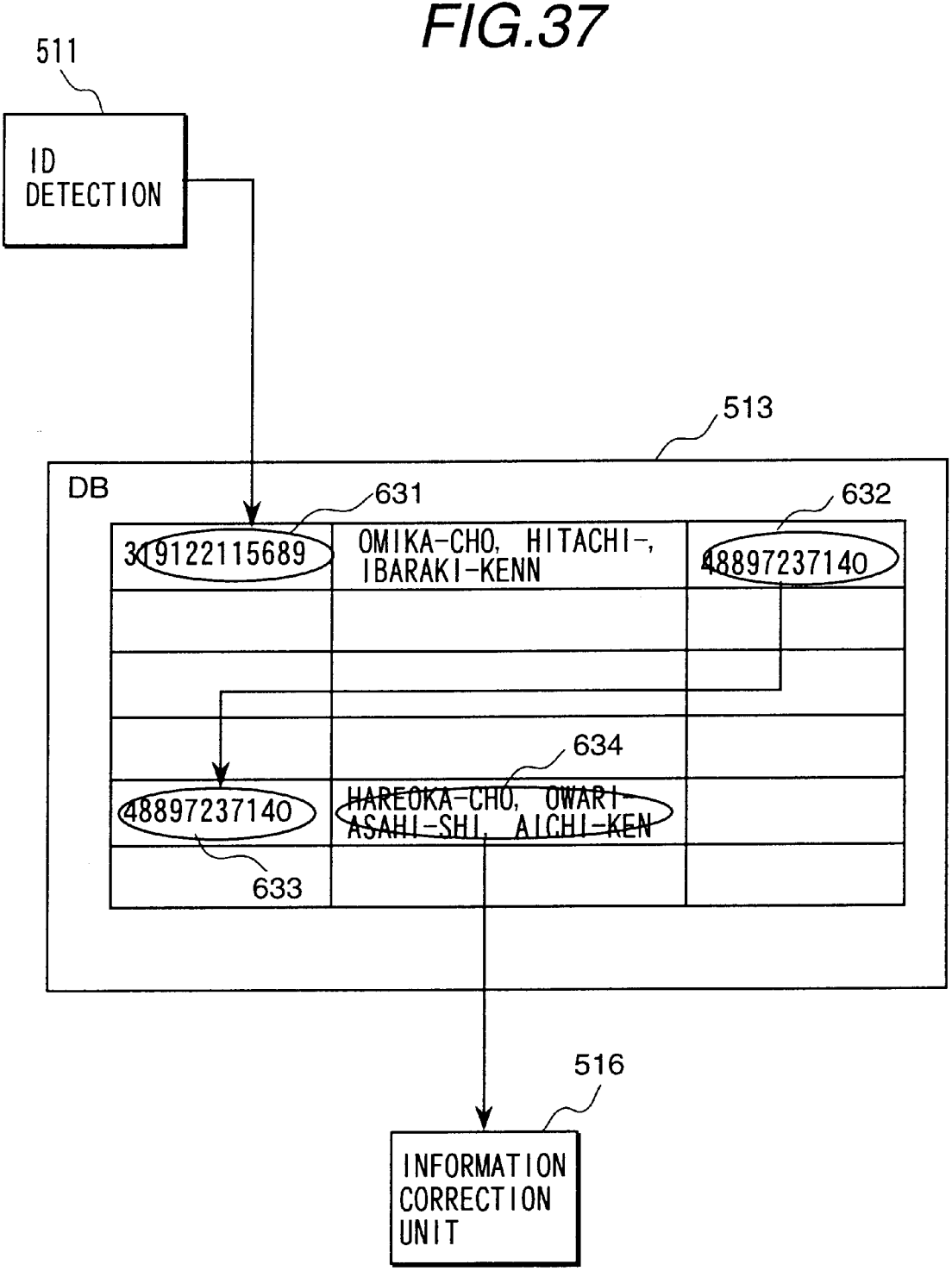
FIG. 37 is a diagram showing the data base reference flow.

FIG. 37 is a conceptual diagram used for explaining to recognition of the bar code by the ID detection unit 511 and for obtaining additional recording information after the address code is ascertained. The ID detection unit 511 detects the ID from the bar code of the distribution article 530, retrieves a tag 631 of the data base 513 using it as a key, and refers to a change of address field 632 equivalent to it.

The ID detection unit 511 detects the data base 513 once again using it as a key, retrieves a tag 633, and outputs an address field 634 as an input of the information correction unit 516.

Figure 38:
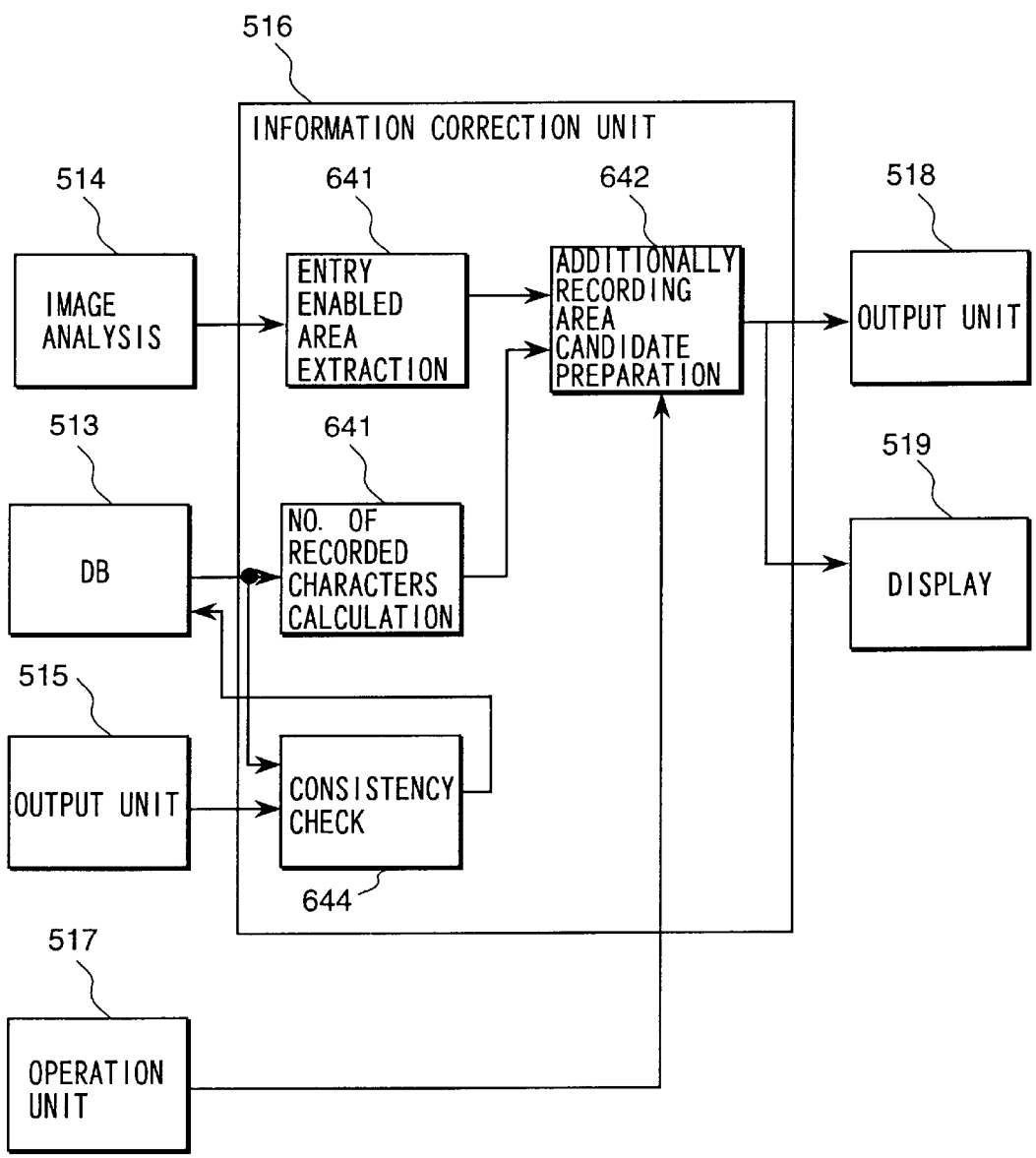
FIG. 38 is a block diagram of an information correction unit.
Figure 39A:
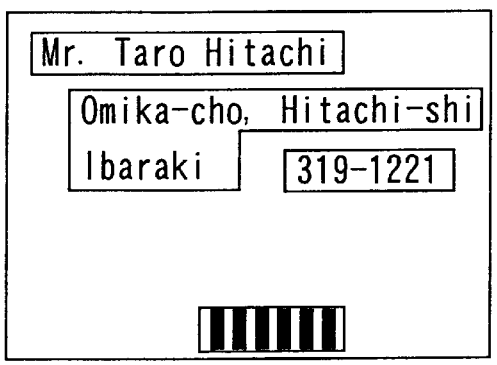
Figure 39A:
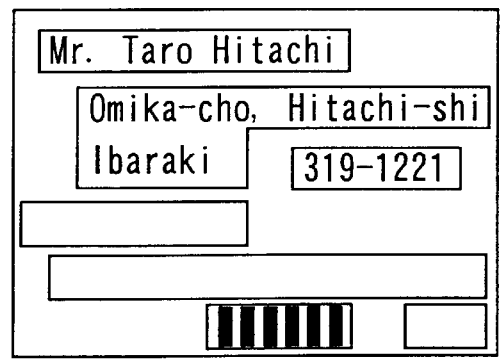
Figure 39A:
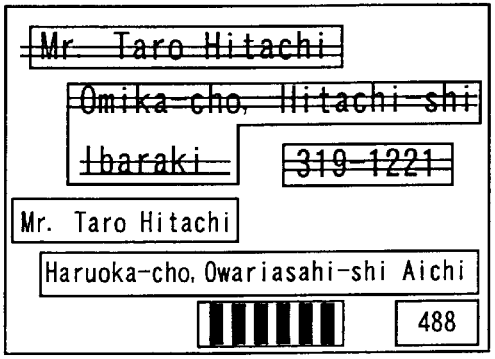
Figure 39A:
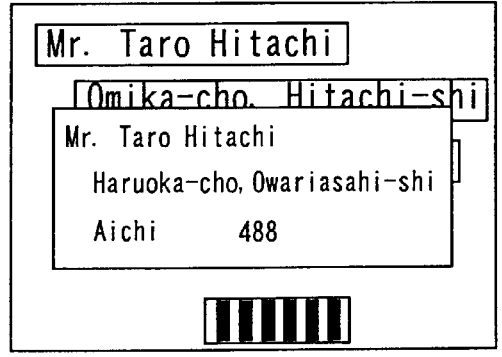

FIG. 38 shows a block diagram of the information correction unit 516. The data base 513 calculates the number of characters to be additionally recorded by a number of recorded characters calculation unit 661 and outputs it to an additional recording area candidate preparation unit 662. A consistency check unit 664 compares the data from the data base 513 with the result of address recognition by the character recognition unit 515 and checks whether it is the address which existed prior to address changing. When it is to be newly registered as address change, the character recognition result also can be registered in the data base.

Using area separation data and character separation data from the image analysis section 514, an entry enabled area extraction unit 660 extracts an area capable of additional recording. Using the area capable of additional recording and the output of the number of recorded characters calculation unit 661, an additional recording area candidate to the distribution article 530 is prepared. This is displayed on the display unit 519, and, on the basis of information of the mouse and the pointer 520, the operation unit 517 instructs correction and changing of the additional recording area. When the additional recording area can be in a desired position, the operation unit 517 instructs print output to the output unit 518.

FIGS. 39($a$) to 39($d$) are diagrams showing the function of the information correction unit 516. For establishing an area capable of additional recording, as shown in FIG. 39($a$), which is prepared by the entry enabled area extraction unit 740, based on the output of the number of recording characters calculation unit 741, the information correction unit 516 prepares additional recording area candidates 531$s$, 532$s$, and 533$s$, shown in FIG. 39($b$), for the distribution article 530. Thereafter, the information correction unit 516 converts the code from the data base 513 to an image, composes the characters, and displays a composite image on which an old address erasing line 534 is overwritten and printed.

In this case, when a space for additional recording cannot be ensured on the surface of the distribution article 530, a composite image, corresponding to a label on which an address is newly printed and is attached on the distribution article 530 by an operator, is also displayed.

Figure 40:
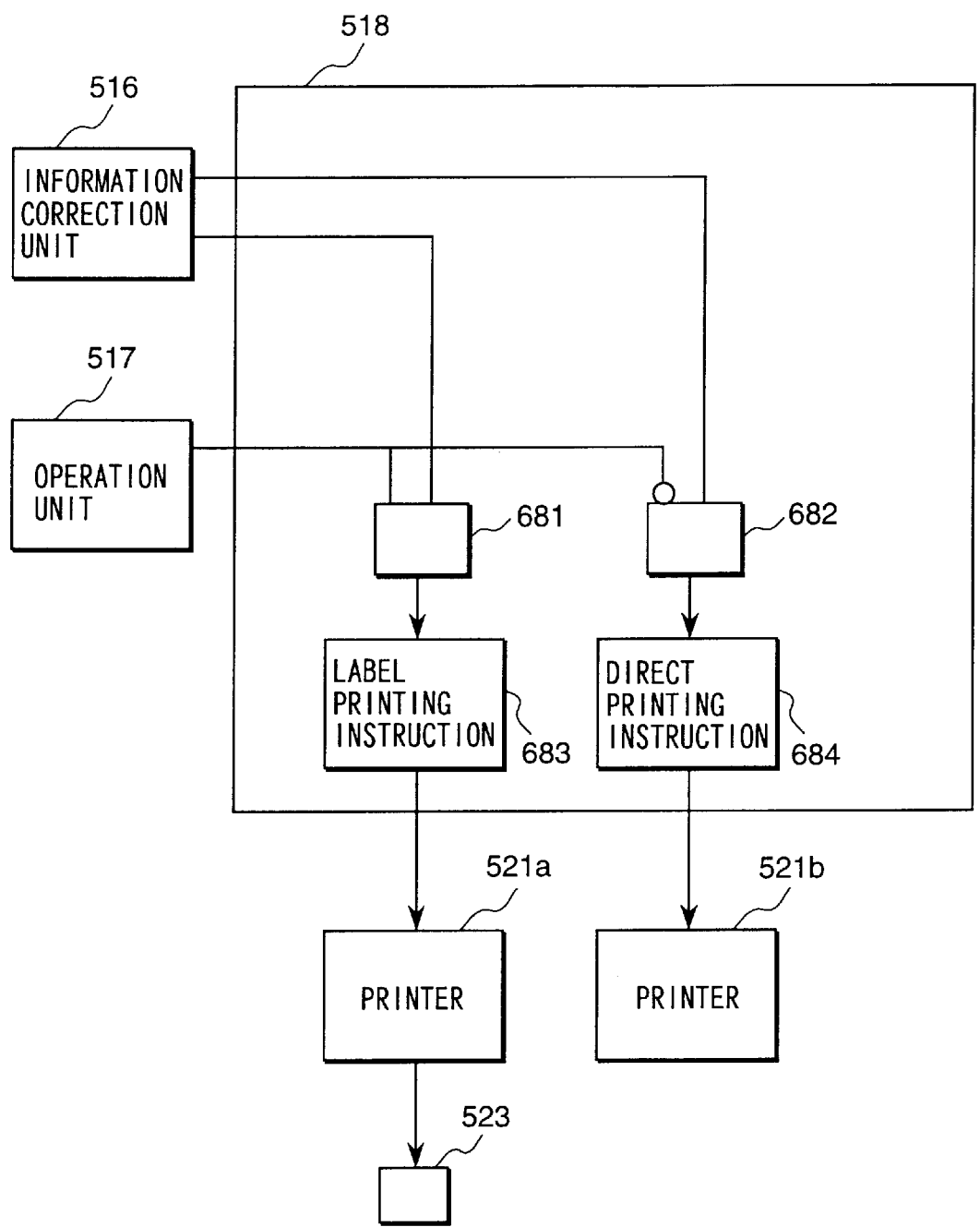
FIG. 40 is a block diagram of an output unit.

FIG. 40 shows an example of the output unit 518. The output unit 518 inputs a proposed composite image from the information correction unit 516, inputs a selection signal from the operation unit 517, prints a label via gates 681 and 682, and selects whether to attach it on the distribution article 530 or to directly print on the distribution article 530. The label printer 521 a starts printing using the output of a label output print instruction unit 683 and the direct printer 521$b$ starts printing using the output of a direct print instruction unit 684.

Figure 41:
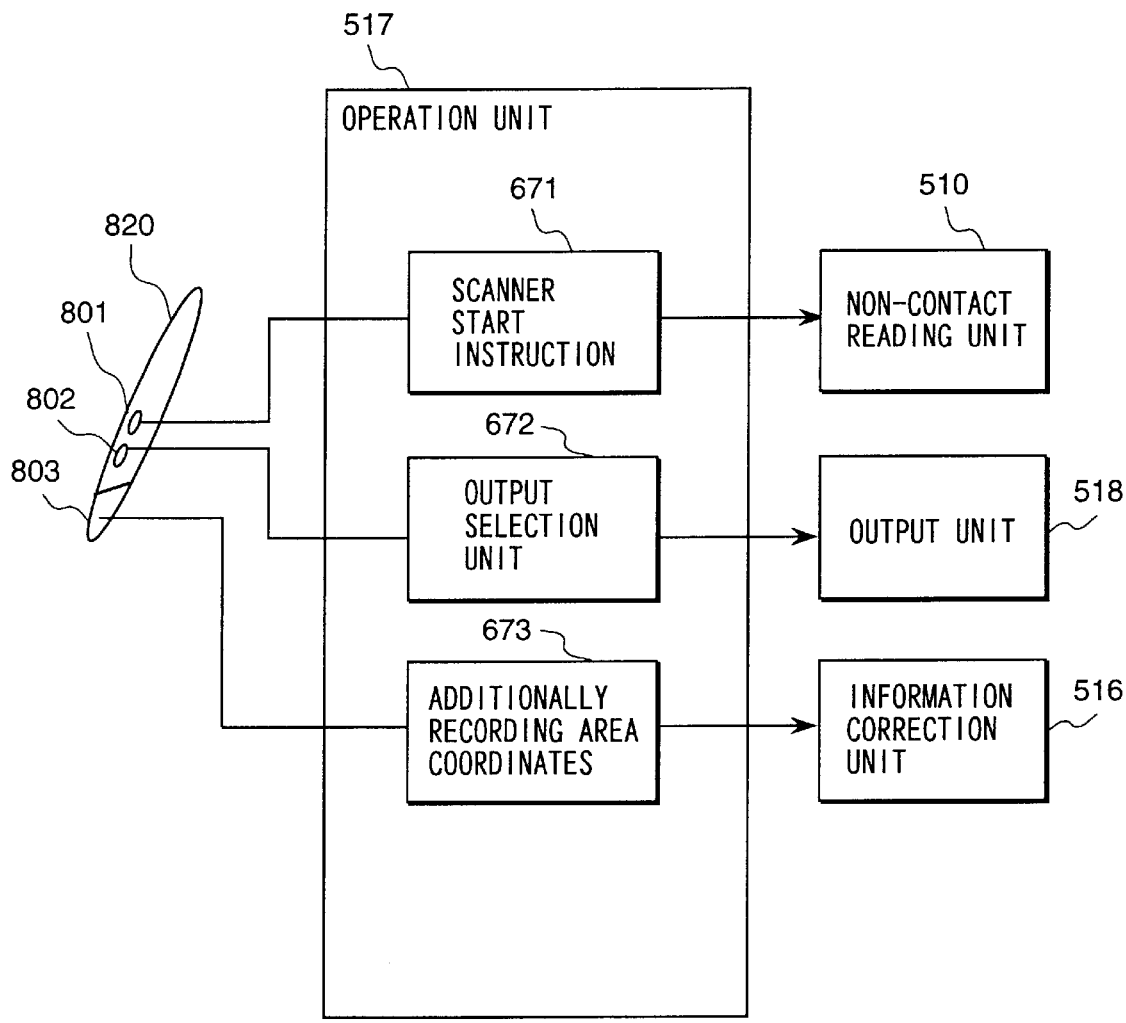
FIG. 41 is a block diagram of an operation unit.

FIG. 41 shows a block diagram of the operation unit 517. A pointer 820 comprises a marker unit 803 which provides a coordinate input function like a mouse or a tablet, a start switch 801 for instructing start of the scanner, and a switch 802 for instructing selection of an output image. The marker unit 803 outputs changing and correction coordinates of an additional recording area to the information correction unit 516 from an additional recording area coordinate preparation unit 673. The start switch 801 for instructing the start of the scanner operation executes a reading start of the non-contact reading unit 510 via a scanner start instruction unit 671. The output of the switch 802 for instructing selection of an output image is used to determine image selection of the output unit 518 via an output selection instruction unit 672.

Figure 42:
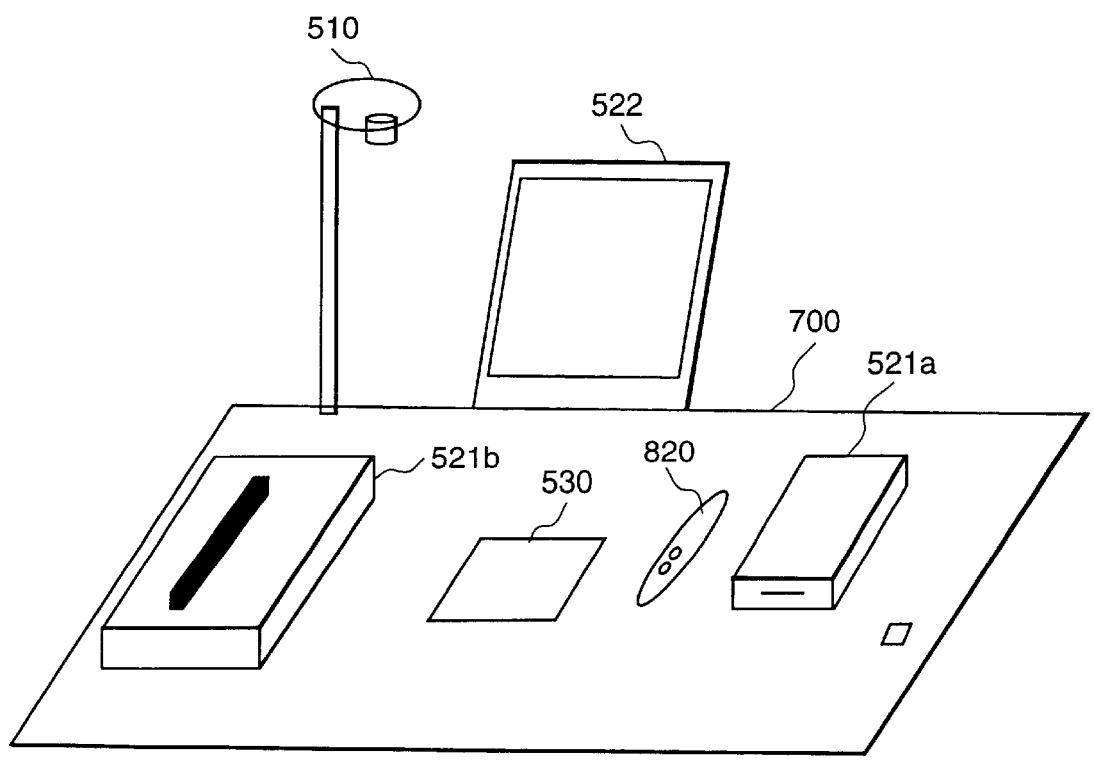
FIG. 42 is a prospective view of the overall equipment.

FIG. 42 is a prospective view of the equipment. The equipment executes reading of the distribution article 530 on the desk 700 in a non-contact by the non-contact scanner 510. The reading is initiated by operation of the switch of the pointer 820. A composite image prepared by a read image and information obtained from the data base is displayed on the display 522, the image is corrected by the pointer 820, and then the image is additionally printed on the distribution article by the label printer 521$a$ or the direct printer 521$b$.

By operation of the aforementioned invention in this manner, information can be easily corrected.

According to the present invention, a non-contact image reader for reading characters written on the surface of a folded form or a thick book in a good operability state and on a high image quality basis can be provided.

A simple non-contact image reader having a high degree of freedom can also be provided.

Since images of a document on a plane, such as a folded form or a thick book, can be input on a high image quality basis by a simple operation of a digital camera without fixing an object and using a special distance detection sensor, the operability when information drawn on a paper or plane is to be digitally read can be improved substantially.

The time required for scanning a reading head like a flat bed scanner is not necessary and the reading operation can be speeded up. Furthermore, the imaging conditions are little restricted and images can be read from a free position. Even when the equipment is not in use, a large installation area like a flat bed scanner is not necessary and the operation performed by a user will be not disturbed.

The change information in the data base can be additionally recorded in the document information of a distribution article, and so hand operations can be reduced substantially.

What is claimed is:

1. A non-contact image reader comprising:
    a reading unit to form an image on a sensor via a lens, and to convert an image detected by said sensor into electric signals,
    a reading condition changing unit to change reading conditions of said reading unit,
    a storage unit to store at least two read images obtained by reading one image plane under at least two different reading conditions which are changed by said reading condition changing unit,
    a characteristic point extraction unit to extract characteristic points between the at least two read images stored in said storage unit,
    a distance measuring unit to measure the distance between said lens and the characteristic points in the at least two read images, and
    an image correction unit to compose a planar composite image from the at least two read images on the basis of the result of measurement by said distance measuring unit.

2. A non-contact image reader according to claim 1, wherein diffusion values between the at least two images are used as the characteristic points.

3. A non-contact image reader according to claim 1 or 2, wherein said reading condition of said reading condition changing unit is a focal position or swing angle.

4. A non-contact image reader according to claim 1 or 2, wherein said reading condition changing unit changes at least two of said reading conditions in back and forth scanning operations of said reading unit.

5. A non-contact image reader according to claim 1 or 2, wherein said image correction unit, when said reading unit reads said image obliquely from above, geometrically corrects the distortion of said read image.

6. A non-contact image reader according to claim 2, wherein said image correction unit approximates said plurality of characteristic points to straight lines, detects end points of a plurality of straight lines, measures the distance between said end points, calculates the position to be developed on a plane on the basis of said distance, and develops the image on said plane.

7. A non-contact image reader according to claim 6, wherein said image correction unit processes a read image plane for each polygon area.

8. A non-contact image reader according to claim 1, wherein said reading unit has means to read and store a white paper before said reading unit reads said image.

9. A non-contact image reader comprising:
- a reading unit to form an image on a sensor via a lens, and to convert an image detected by said sensor into electric signals,
- a reading condition changing unit to changing to change reading conditions of said reading unit,
- a storage unit to store at least two read images obtained by reading one image plane under at least two different reading conditions which are changed by said reading condition changing unit,
- a scanner unit having a characteristic point extraction unit to extract characteristic points between the at least two images stored in said storage unit, a distance measuring unit to measure a distance between said lens and the characteristic points in the at least two read images, and an image correction unit to compose a planar composite image from the at least two read images on a basis of the result of measurement by said distance measuring unit,
- a support unit to support said scanner unit, and
- a document stand for putting said document on, wherein:
  a mark which is a guideline for positioning said document is provided on said document stand.

10. A non-contact image reader comprising:
- a reading unit to form an image on a sensor via a lens, and to convert an image detected by said sensor into electric signals,
- a reading condition changing unit to change reading conditions of said reading unit,
- a storage unit to store at least two read images obtained by reading one image plane under at least two different reading conditions which are changed by said reading condition changing unit,
- a scanner unit having a characteristic point extraction unit to extract characteristic points between the at least two read images stored in said storage unit, a distance measuring unit to measure a distance between said lens and the characteristic points in the at least two read images, and an image correction unit to compose a planar composite image from the at least two read images on a basis of the result of measurement by said distance measuring unit,
- an image processing unit to recognize an image correction signal output from said scanner unit and to perform image processing,
- an image display unit to display image-processed data, and
- an image recording unit to output said image-processed data.

* * * * *